(12) United States Patent
Bae

(10) Patent No.: US 6,565,476 B1
(45) Date of Patent: May 20, 2003

(54) CAR CLUTCH

(76) Inventor: Myung-soon Bae, 101-1504 Daeback Apt., 540 Okkye-dong, Gumi-shi, Kyungsangbuk-do 730-380 (KR)

(*) Notice: Subject to any disclaimer, the term of this patent is extended or adjusted under 35 U.S.C. 154(b) by 0 days.

(21) Appl. No.: 09/979,685

(22) PCT Filed: May 23, 2000

(86) PCT No.: PCT/KR00/00516

§ 371 (c)(1),
(2), (4) Date: Nov. 21, 2001

(87) PCT Pub. No.: WO00/73098

PCT Pub. Date: Dec. 7, 2000

(30) Foreign Application Priority Data

May 26, 1999 (KR) .............................. 99-18990

(51) Int. Cl.[7] .............................. F16H 3/44; F16D 21/04
(52) U.S. Cl. .......................... 475/320; 475/269; 192/20
(58) Field of Search ................... 192/20, 220; 475/269, 475/317, 320, 321, 322

(56) References Cited

U.S. PATENT DOCUMENTS

| | | | |
|---|---|---|---|
| 3,844,393 A | 10/1974 | Zaiser | |
| 3,921,774 A | 11/1975 | Hagen | |
| 4,299,141 A | * 11/1981 | Fairchild | ................ 475/322 X |
| 5,846,153 A | * 12/1998 | Matsuaoka | ................ 475/269 |

FOREIGN PATENT DOCUMENTS

| | | |
|---|---|---|
| JP | 8-200398 | 6/1996 |
| JP | 11-063014 | 5/1999 |

* cited by examiner

*Primary Examiner*—Sherry Estremsky
*Assistant Examiner*—Roger Pang
(74) *Attorney, Agent, or Firm*—Knobbe, Martens, Olson & Bear, LLP

(57) ABSTRACT

A car clutch including a clutch base formed with a seating part and an input-side ring gear. An output shaft is fitted through the seating part and has first and second sun gears. A first carrier member is in contact with the clutch base and a second carrier member is installed on a clutch cover. A first planetary gear is meshed with the first sun gear and the input-side ring gear. A secondary planetary gear is meshed with the second sun gear. A first rotating member has an output-side ring gear which is meshed with second planetary gears. Clutch springs are installed on a second rotating member. Power shutoff rods are installed through the clutch cover and have a fitting projection fitted into a connecting part of the second rotating member. Lever-squeezing elastic members are each installed between each release lever and the clutch cover.

17 Claims, 17 Drawing Sheets

CAR CLUTCH

RELATED APPLICATIONS

This application claims the benefit of the PCT application PCT/KR00/00516 filed May 23, 2000 and the Korean application 1999-18166 filed May 26, 1999.

TECHNICAL FIELD

The present invention relates to a car clutch, and more particularly, to a car clutch which is installed between an engine and a transmission so as to connect and disconnect engine power flow to the transmission.

BACKGROUND ART

Generally, clutches which are used in motor vehicles, are divided into a friction clutch, a fluid clutch and an electric clutch. Friction clutches are classified into a single disc clutch, a multiple disc clutch and a conical clutch. Single disc clutches are categorized into a coil spring type single disc clutch and a diaphragm spring type single disc clutch. Referring to FIG. 1, there is shown a coil spring type friction clutch which is most widely used throughout the world. The coil spring type friction clutch comprises a clutch body 10 which functions to connect and disconnect engine power flow to a transmission and an actuating mechanism 20 which enables a driver to actuate the clutch body 20 while seating on a driver seat.

In the clutch body 10, a clutch cover 11 is mounted to a rear surface of a flywheel 40 which is integrally rotated with an engine crankshaft 30. A pressure plate 12, clutch springs 13, release levers 14 and the like are assembled inside the clutch cover 11. A clutch shaft 50 is supported at one end thereof by a pilot bearing 15 which is installed at a center portion of the engine crankshaft 30 and at the other end thereof by a bearing of a transmission, so as to be integrally rotated with a driving gear of the transmission.

A clutch disc 16 is splined to a clutch shaft 50 and is arranged between the flywheel 40 and the pressure plate 12. The clutch disc 16 functions to allow rotating force of the flywheel 40 to be transferred to the transmission through the clutch shaft 50 due to its frictional engagement therebetween.

The pressure plate 12 is usually maintained in a state herein it is pressed toward the clutch disc 16 by the clutch springs 13, and thereby the clutch disc 16 is tightly engaged with the flywheel 40. If a driver depresses a clutch pedal 22, a release bearing 24 presses proximal ends of the release levers 14. By virtue of lever actions of the release levers 14, the pressure plate 12 is disengaged from the clutch disc 16 and a clearance is created between the flywheel 40 and the clutch disc 16, whereby power of the flywheel 40 is not transmitted to the clutch shaft 50.

However, in the conventional car clutch constructed as mentioned above, in the case that the clutch pedal 22 is abruptly released after being depressed, the clutch disc 16 is momentarily and tightly engaged with a surface of the flywheel 40, and engine power is suddenly transferred to the transmission. As a consequence, due to quick load application, an engine can be stopped. In this regard, inconvenience is caused in that it is required to precisely actuate the clutch pedal 22. Also, since the connection and disconnection of engine power flow to the transmission is effected by frictional contact between the clutch disc 16 and the flywheel 40, fuel efficiency is deteriorated. In the case that the driver has a bad driving habit, the fuel efficiency is remarkably decreased. Moreover, because wear of the clutch disc 16 is induced due to the frictional contact between the clutch disc 16 and the flywheel 40, the clutch disc 16 must be frequently replaced with new one, whereby a maintenance fee of the car clutch is increased and environmental pollution is provoked due to dust of clutch disc friction material such as asbestos.

DISCLOSURE OF INVENTION

Accordingly, the present invention has been made in an effort to solve the problems occurring in the related art, and an object of the present invention is to provide a car clutch which does not require a precise actuation of a clutch pedal, thereby improving driver convenience upon depressing the clutch pedal, and in which power consumption is lessened and replacement of parts is minimized thereby to reduce a maintenance fee of the car clutch.

In order to achieve the above object, according to a first aspect of the present invention, there is provided a car clutch wherein a clutch cover is mounted to a free end surface of a flywheel which is integrally rotated with a crankshaft of an engine, power of the flywheel is transmitted to a clutch shaft by means of a clutch mechanism which is disposed inside the clutch cover, and, when a driver depresses a clutch pedal, a release bearing presses proximal ends of release levers and, by virtue of lever actions of the release levers, power of the flywheel is not transmitted to the clutch shaft, the clutch mechanism comprising: a disc-shaped clutch base interposed between the flywheel and the clutch cover, coupled to the flywheel along with the clutch cover, and formed at a center portion thereof with a seating part which projects in one direction toward the flywheel; a cylindrical output shaft rotatably fitted at one end thereof through the seating part of the clutch base and at the other end thereof through the clutch cover, and having a first sun gear and a second sun gear which are integrally formed on a circumferential outer surface thereof and spline grooves which are defined on a circumferential inner surface thereof, the first and second sun gears having different numbers of teeth or different modules; a pair of first planetary gear sections oppositely arranged to each other and each possessing a first guide shaft and a first planetary gear, the first guide shaft having one end which is rotatably fitted through the seating part of the clutch base and the other end which is rotatably supported by the clutch cover, the first planetary gear being integrally formed on a circumferential outer surface of the first guide shaft and being meshed with the first sun gear of the cylindrical output shaft; a pair of second planetary gear sections oppositely arranged to each other and each possessing a second guide shaft and a second planetary gear, the second guide shaft having one end which is rotatably fitted through the seating part of the clutch base and the other end which is rotatably supported by the clutch cover, the second planetary gear being integrally formed on a circumferential outer surface of the second guide shaft and being meshed with the second sun gear of the cylindrical output shaft; an annular plate-shaped first rotating member rotatably brought into contact at one surface thereof with the clutch base by the medium of a first thrust bearing, the first rotating member having a first internal ring gear and a first connecting part, the first internal ring gear being formed on a circumferential inner edge of the first rotating member and being meshed with first planetary gears of the pair of first planetary gear sections, the first connecting part being formed on the other surface of the first rotating member adjacent to a circumferential outer edge of the first rotating member and having a plurality of first corrugations which axially project from a plane of the first rotating member to extend in the other direction toward the clutch cover; an annular plate-shaped second rotating member rotatably brought into contact at one surface thereof with the other surface of the first rotating member by the medium of a second thrust bearing and at the other surface thereof with the clutch cover by the medium of a third thrust bearing, the second rotating member having a second internal ring gear and a circumferential recess, the second internal ring gear being formed on a circumferential inner edge of the second rotating member and being meshed with second planetary gears of the pair of second planetary gear sections, the circumferential recess being defined along an axial middle portion of a circumferential outer edge of the second rotating member; an annular plate-shaped third rotating member having a boss which is integrally formed along a circumferential inner edge of the third rotating member in a manner such that the boss axially projects from a plane of the third rotating member to extend in the one direction toward the clutch base, the boss having a second connecting part and a circumferential guide projection, the second connecting part being formed on a free end surface of the boss and having a plurality of second corrugations which axially project from the free end surface of the boss to extend in the one direction toward the clutch base is in a manner such that the second corrugations are meshed with the first corrugations of the first rotating member, the circumferential guide projection being formed on a circumferential inner surface of the boss to extend in a radial direction and being brought into sliding contact with the circumferential outer edge of the second rotating member; semiclutch means having one ends which are connected to the third rotating member and the other ends which are connected to the second rotating member, so as to enable a semi-clutching operation of the clutch to be implemented; a plurality of elastic clutching members having one ends which are fitted into the circumferential recess of the second rotating member and the other ends which elastically bias the third rotating member in the one direction toward the clutch base; and a plurality of disengaging members inserted through the clutch cover and moved in the other direction toward the clutch cover when external force is applied to the proximal ends of the release levers, thereby to disengage the third rotating member from the first rotating member.

Each disengaging member comprises a pull rod inserted through the clutch cover, formed at one end thereof with a head portion which is grasped by a distal end of the release lever, and defined adjacent to the other end thereof with a circumferential groove; a pull rod-inserting boss formed on the clutch base in a manner such that the other end of the pull rod is inserted therein; a pressing ring fitted around the pull rod to be brought into contact with one surface of the third rotating member adjacent to a circumferential outer edge of the third rotating member; and a release-preventing ring fitted into the circumferential groove to prevent the pressing ring from being released from the pull rod.

Each release lever is hingedly coupled to an outer surface of the clutch cover.

A car clutch which is provided according to a second aspect of the present invention, is operated in the same manner as the car clutch according to the first aspect of the present invention, except that actuating means for disconnecting power flow to a transmission employs an electromagnetic device which is configured in such a way as to attract the third rotating member when current is supplied thereto through manipulation of a switch button. The electromagnetic device comprises an electromagnetic ring installed on an inner surface of the clutch cover in a manner such that the electromagnetic ring is opposite to the magnetic plate portion of the third rotating member; a ground member locked to an outer surface of the clutch cover and connected to the electromagnetic ring via a first terminal cable having a negative polarity; a guide boss fastened to the clutch cover around a center hole of the clutch cover, through which the clutch shaft is fitted; an insulating ring fitted around the guide boss; a first brush member fitted around the insulating ring in a manner such that the first brush member is integrally rotated with the insulating ring, the first brush member being connected to the electromagnetic ring via a second terminal cable having a positive polarity; and a second brush member fitted around the first brush member in a manner such that the second brush member is fixedly maintained with respect to the first brush member, the second brush member being connected to the switch button via a cable.

The magnetic plate portion of the third rotating member has an L-shaped cross-section.

In the car clutches according to the first and second aspects of the present invention, each semi-clutch means comprises a fitting groove defined in a bottom of the circumferential recess of the second rotating member in such a manner that it extends in the radial direction; a fixing pin inserting bore defined through the second rotating member in such a manner that it extends in an axial direction and is communicated with the circumferential recess; a fixing pin which is inserted through the fixing pin inserting bore; a torsion spring wound around the fixing pin and having one end which is fitted into the fitting groove and the other end around which a bushing is fitted; and a guide slot defined in the third rotating member in a manner such that it extends in the radial direction, the other end of the torsion spring being inserted into the guide slot to be slidably moved therein.

On the other hand, according to a third aspect of the present invention, there is provided a car clutch wherein a clutch cover is mounted to a free end surface of a flywheel which is integrally rotated with a crankshaft of an engine, power of the flywheel is transmitted to a clutch shaft by means of a clutch mechanism which is disposed inside the clutch cover, in a flimsy manner when an engine RPM is low, thereby enabling a semi-clutching operation to be implemented and in an intensive manner when an engine RPM is high, and, when a driver depresses a clutch pedal for effecting a speed change, a release bearing presses proximal ends of release levers and, by virtue of lever actions of the release levers, power of the flywheel is not transmitted to the clutch shaft. The clutch mechanism comprises a disc-shaped clutch base interposed between the flywheel and the clutch cover and coupled to the flywheel along with the clutch cover, and having a cylindrical supporting boss which is projectedly formed on an inner surface of the clutch base, the cylindrical supporting boss having first spline grooves which are defined on a circumferential inner surface of the cylindrical supporting boss; a cylindrical output shaft rotatably fitted at one end thereof through the clutch base and at the other end thereof through the clutch cover, and having a sun gear which is formed on a circumferential outer surface thereof and second spline grooves which are defined on a circumferential inner surface thereof; a plurality of planetary gear sections each possessing a guide shaft and a planetary gear, the guide shaft having one end which is rotatably fitted through the clutch base and the other end which is rotatably supported by the clutch cover, the planetary gear being integrally formed on a circumferential outer surface of the guide shaft and being meshed with the sun gear of the cylindrical output shaft; a rotating member having an internal ring gear and third spline grooves, the internal ring gear being formed on a circumferential inner surface of the rotating member and being meshed with planetary gears of the plurality of planetary gear sections, the third spline grooves being defined on a circumferential outer surface of the rotating member; a multiple disc clutch member having a plurality of inner plates which are fitted around the rotating member and a plurality of outer plates which are fitted into the cylindrical supporting boss of the clutch base and each of which is intervened between two adjoining inner plates, each inner plate having spline teeth which are formed on a circumferential inner surface thereof and are splined into the third spline grooves of the rotating member, each outer plate having spline teeth which are formed on a circumferential outer surface thereof and are splined into the first spline grooves of the cylindrical supporting boss; a pressing member disposed between the multiple disc clutch member and the clutch cover for elastically biasing the multiple disc clutch member in one direction toward the clutch base in a manner such that the inner plates and the outer plates are brought into tight contact one with another and thereby are locked one to another; a plurality of pull rods inserted through the clutch cover and having one ends which are coupled to distal ends of the release levers and the other ends which are fastened to the pressing member, in a manner such that they are moved in the other direction toward the clutch cover when external force is applied to the proximal ends of the release levers, thereby to separate the pressing member from the multiple disc clutch member; and pressure adjusting means arranged in a circumferential space which is defined between the clutch base and the clutch cover, in a manner such that each pressure adjusting means is capable of pivoting movement depending upon a magnitude of centrifugal force which is generated by rotation of the flywheel, for adjusting a pressure which is applied to the multiple disc clutch member by the pressing member, in response to an engine RPM.

A car clutch according to a fourth aspect of the present invention is constructed by the fact that structures of the planetary gear sections according to the third aspect of the present invention are modified to increase a reduction gear ratio thereby to lessen frictional force of a multiple disc clutch member and extend a lifetime of friction material. A clutch mechanism according to the fourth aspect of the present invention comprises a disc-shaped clutch base interposed between the flywheel and the clutch cover and coupled to the flywheel along with the clutch cover, and having a cylindrical supporting boss and a cylindrical ring gear boss which are projectedly formed on an inner surface of the clutch base in a manner such that the cylindrical ring gear boss is placed inward of the cylindrical supporting boss, the cylindrical supporting boss having first spline grooves which are defined on a circumferential inner surface of the cylindrical supporting boss, the cylindrical ring gear boss having a first internal ring gear which is formed on a circumferential inner surface of the cylindrical ring gear boss; a cylindrical output shaft rotatably fitted at one end thereof through a center portion of the clutch base and at the other end thereof through the clutch cover, and having a sun gear which is formed on a circumferential outer surface thereof and second spline grooves which are defined on a circumferential inner surface thereof; a carrier having a first disc and a second disc which are coupled with each other by means of a plurality of connecting members in a manner such that the first disc and the second disc are spaced apart from each other by a predetermined distance, the first disc being rotatably brought into contact at one surface thereof with the inner surface of the clutch base by the medium of a first thrust bearing, the second disc being rotatably brought into contact with the clutch cover by the medium of a second thrust bearing; a plurality of double planetary gear sections fitted around the plurality of connecting members, respectively, in such a way as to be disposed in the carrier, and each having integrally formed thereon a first planetary gear and a second planetary gear, the first planetary gear being meshed with the first internal ring gear, the second planetary gear being meshed with the sun gear of the cylindrical output shaft; a ring-shaped rotating member having a second internal ring gear and third spline grooves, the second internal ring gear being formed on a circumferential inner surface of the rotating member and being meshed with second planetary gears of the plurality of double planetary gear sections, the third spline grooves being defined on a circumferential outer surface of the rotating member; a multiple disc clutch member having a plurality of inner plates which are fitted around the rotating member and a plurality of outer plates which are fitted into the cylindrical supporting boss of the clutch base and each of which is intervened between two adjoining inner plates, each inner plate having spline teeth which are formed on a circumferential inner surface thereof and are splined into the third spline grooves of the rotating member, each outer plate having spline teeth which are formed on a circumferential outer surface thereof and are splined into the first spline grooves of the cylindrical supporting boss; a pressing member disposed between the multiple disc clutch member and the clutch cover for elastically biasing the multiple disc clutch member in one direction toward the clutch base in a manner such that the inner plates and the outer plates are brought into tight contact one with another and thereby are locked one to another; a plurality of pull rods inserted through the clutch cover and having one ends which are coupled to distal ends of the release levers and the other ends which are fastened to the pressing member, in a manner such that they are moved in the other direction toward the clutch cover when external force is applied to the proximal ends of the release levers, thereby to separate the pressing member from the multiple disc clutch member; and pressure adjusting means arranged in a circumferential space which is defined between the clutch base and the clutch cover, in a manner such that each pressure adjusting means is capable of pivoting movement for adjusting a pressure which is applied to the multiple disc clutch member by the pressing member, depending upon a magnitude of centrifugal force which is generated by rotation of the flywheel.

In the car clutches according to the third and fourth aspects of the present invention, the pressing member comprises a pressure plate possessing an annular plate-shaped configuration and having a pressing part which projects from a plane of the pressure plate to be brought into contact with the multiple disc clutch member, the pressing part defining a plurality of spring receiving grooves on a surface thereof which is opposed to the multiple disc clutch member, the pressure plate being formed with a plurality of pull rod inserting holes through which the plurality of pull rods are inserted, respectively; and a plurality of springs inserted into the plurality of spring receiving grooves, respectively.

In the car clutches according to the third and fourth aspects of the present invention, each pressure adjusting means comprises a support bar fastened at both ends thereof to the is clutch base and the clutch cover, respectively, and having an externally threaded portion which is formed on a circumferential outer surface and at a middle portion thereof; a compression spring fitted around the support bar;

a bearing-supporting ring fitted around the support bar in a manner such that it is brought into contact with an end of the compression spring; an adjusting ring arranged in a side-by-side relationship with the pressure plate of the pressing member, so that support bars of all pressure adjusting means extend therethrough; a balancing weight having one end which is placed between the compression spring and the adjusting ring and is formed with an internally threaded portion through which the support bar is threadedly coupled to the balancing weight to allow the balancing weight to be capable of pivoting movement about the one end of the balancing weight; an elastic member having one end which is secured to the other end of the balancing weight and the other end which is secured to the clutch cover, so that the elastic member can return the balancing weight which is pivotally moved by the centrifugal force of the flywheel, to its original position; and a pair of guide bearings fitted around the support bar and located at both sides, respectively, of the one end of the balancing weight, to smooth the pivoting movement of the balancing weight.

In the car clutch according to the fourth aspect of the present invention, the first and second planetary gears have different numbers of teeth or different modules, to allow a predetermined reduction gear ratio to be obtained.

In a car clutch according to a fifth aspect of the present invention, the pressing member of each of the car clutches according to the third and fourth aspects of the present invention comprises a hydraulic device which is actuated through manipulation of a switch button by a driver, to bias the multiple disc clutch member in the one direction toward the clutch base, and an annular leaf spring is installed on the cylindrical supporting boss of the clutch base, to exert elastic pressing force on the hydraulic device thereby to remove external force which is applied to the multiple disc clutch member, whereby, without pressing the release levers by virtue of depressing the clutch pedal, the clutch can be operated and thereby the clutch pedal, release levers and the pressure adjusting means can be eliminated.

According to a sixth aspect of the present invention, there is provided a car clutch wherein a clutch cover is mounted to a free end surface of a flywheel which is integrally rotated with a crankshaft of an engine, power of the flywheel is transmitted to a clutch shaft by means of a clutch mechanism which is disposed inside the clutch cover, and, when a driver depresses a clutch pedal, a release bearing presses proximal ends of release levers and, by virtue of lever actions of the release levers, power of the flywheel is not transmitted to the clutch shaft, the clutch mechanism comprising: a disc-shaped clutch base interposed between the flywheel and the clutch cover, coupled to the flywheel along with the clutch cover, and formed at a center portion thereof with a seating part which projects in one direction toward the flywheel and a cylindrical ring gear boss which projects in the other direction toward the clutch cover, the cylindrical ring gear boss having an input-side internal ring gear which is formed on a circumferential inner surface of the cylindrical ring gear boss; a cylindrical output shaft rotatably fitted at one end thereof through the seating part of the clutch base and at the other end thereof through the clutch cover, and having a first sun gear and a second sun gear which are integrally formed on a circumferential outer surface thereof and spline grooves which are defined on a circumferential inner surface thereof; a carrier having a first carrier member and a second carrier member, the fist carrier member being rotatably brought into contact with an inner surface of the clutch base by the medium of a first thrust bearing and having a plurality of shaft inserting holes which are spaced apart one from another by a predetermined angle along a circumferential direction and an output shaft inserting hole which is defined at a center portion of the first carrier member to allow one end of the cylindrical output shaft to be inserted therethrough, the second carrier member being rotatably brought into contact with the clutch cover by the medium of a second thrust bearing and having a plurality of shaft inserting holes which are spaced apart one from another by the predetermined angle along the circumferential direction and an output shaft inserting hole which is defined at a center portion of the second carrier member to allow the other end of the cylindrical output shaft to be inserted therethrough; a pair of first planetary gear sections oppositely arranged to each other and each possessing a first guide shaft and a first planetary gear, the first guide shaft being installed between the first and second carrier members, the first planetary gear being fitted around the first guide shaft and being meshed with the first sun gear and the input-side internal ring gear; a pair of second planetary gear sections oppositely arranged to each other and each possessing a second guide shaft and a second planetary gear, the second guide shaft being installed between the first and second carrier members, the second planetary gear being fitted around the second guide shaft and being meshed with the second sun gear; a first rotating member possessing a cylindrical configuration, having an output-side internal ring gear which is formed on a circumferential inner surface of the first rotating member and is meshed with second planetary gears of the pair of second planetary gear sections and an auxiliary ring part which is integrally formed at an end of the first rotating member in such a way as to extend in a radial direction and is rotatably brought into contact with the clutch base, the auxiliary ring part having a plurality of engaging projections which are projectedly formed on a circumferential outer edge of the auxiliary ring part in such a way as to be spaced apart one from another along the circumferential direction and a plurality of spring engaging pieces which are integrally secured to a surface of the auxiliary ring part adjacent to the circumferential outer edge of the auxiliary ring part in such a way as to be spaced apart one from another along the circumferential direction and extend in an axial direction; a second rotating member rotatably supported between the clutch base and the clutch cover, formed with two outward flange parts which are bent at an angle of 90° at both ends of the second rotating member to extend in the radial and circumferential directions to define a U-shaped cross-section, and having a connecting part which is projectedly formed on a circumferential outer surface of the second rotating member, the connecting part having a plurality of fitting grooves which are defined on a surface of the connecting part in a manner such that they are spaced apart one from another by a preset angle along the circumferential direction, one of the two outward flange parts having a plurality of engaging grooves which are defined on a circumferential inner edge of the one outward flange part in a manner such that the plurality of engaging projections of the first rotating member can be engaged into the plurality of engaging grooves, respectively, in such a way as to be capable of being rotated therein within the range of an angle; a plurality of clutch springs wound around a plurality of fixing pins, respectively, which are fastened to the two outward flange parts of the second rotating member, in a manner such that the clutch springs are spaced apart one from another by a preselected angle along the circumferential direction, and each having one end which is inserted into a space defined between two adjoining spring engaging pieces and the other end which is supported by a circumferential inner surface of the second rotating member; a plurality of power shutoff rods installed through the clutch cover in such a way as to be spaced apart one from another along the circumferential direction so that they can be moved into or out of the clutch cover upon applying or removing external force to or from the release levers, and each formed at one end thereof with a fitting projection which is fitted into one of the plurality of fitting grooves of the connecting part of the second rotating member and adjacent to the other end thereof with a flatted portion which is grasped by each release lever; and a plurality of lever-squeezing elastic members each installed between each release lever and the clutch cover in a manner such that external force can be applied to the release lever to fit the fitting projection of the power shutoff rod into one of the plurality of fitting grooves of the connecting part of the second rotating member.

BRIEF DESCRIPTION OF DRAWINGS

The above objects, and other features and advantages of the present invention will become more apparent after a reading of the following detailed description when taken in conjunction with the drawings, in which.

BEST MODE FOR CARRYING OUT THE INVENTION

Figure 1:
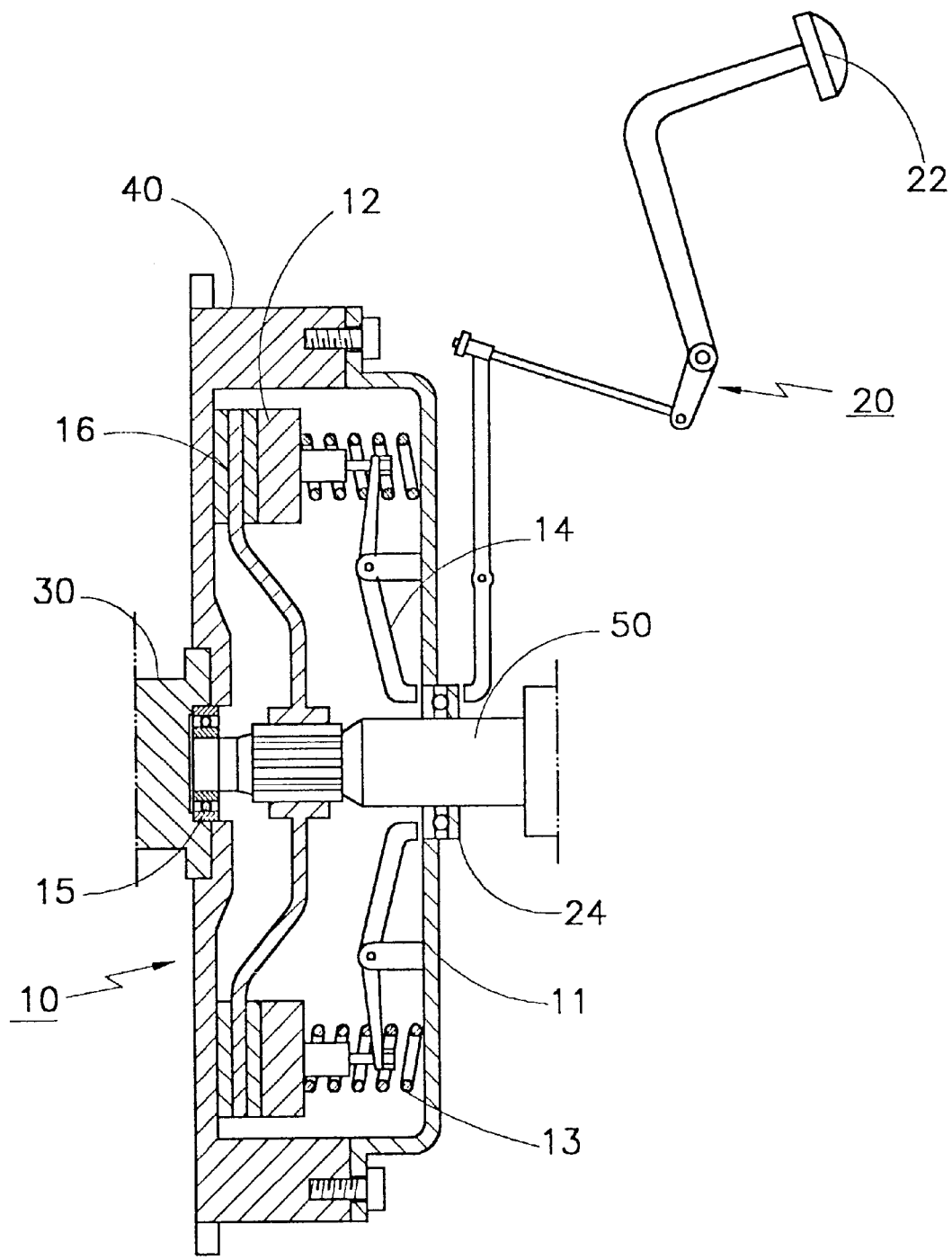
FIG. 1 is a cross-sectional view illustrating the conventional coil spring type friction clutch.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
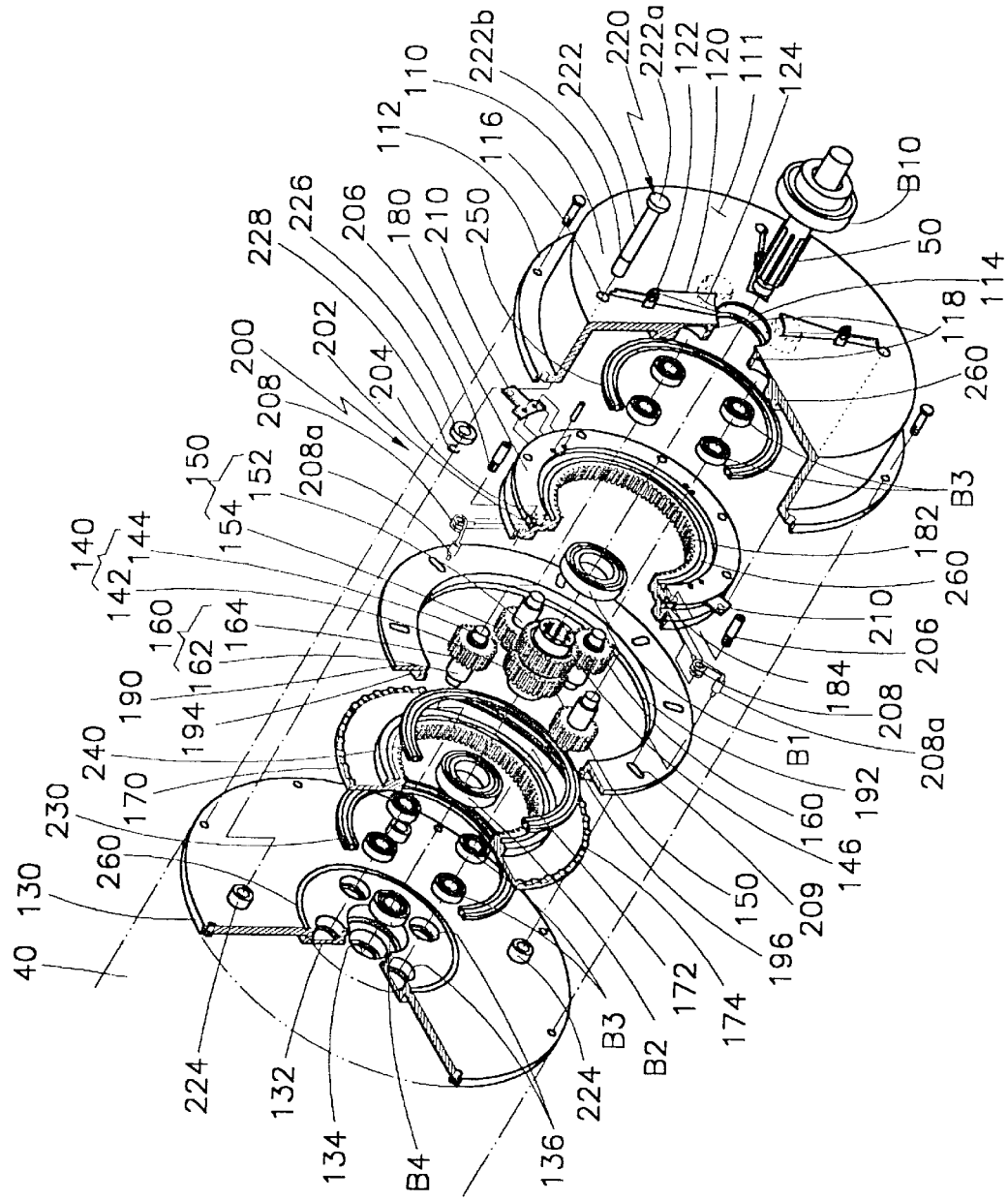
FIG. 2 is an exploded perspective view illustrating a car clutch in accordance with a first embodiment of the present invention.
Figure 3:
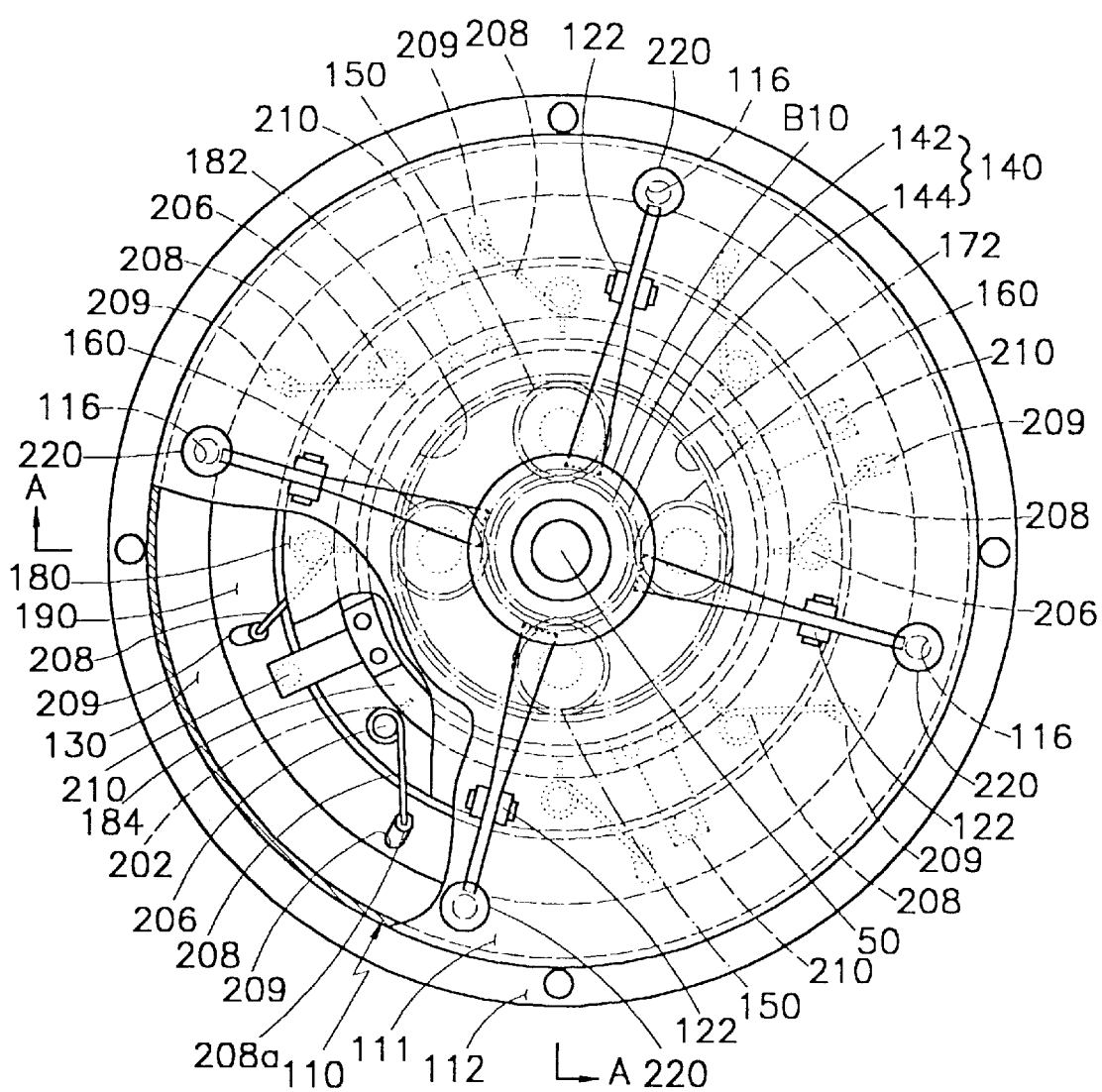
FIG. 3 is a partially broken-away schematic front view illustrating an operation of the car clutch in accordance with the first embodiment of the present invention.

FIG. 2 is an exploded perspective view illustrating a car clutch in accordance with a first embodiment of the present invention; FIG. 3 is a partially broken-away schematic front view illustrating an operation of the car clutch in accordance with the first embodiment of the present invention; and FIG. 4 is a partially enlarged cross-sectional view taken along the line A—A of FIG. 3, illustrating the car clutch in accordance with the first embodiment of the present invention.

Figure 4:
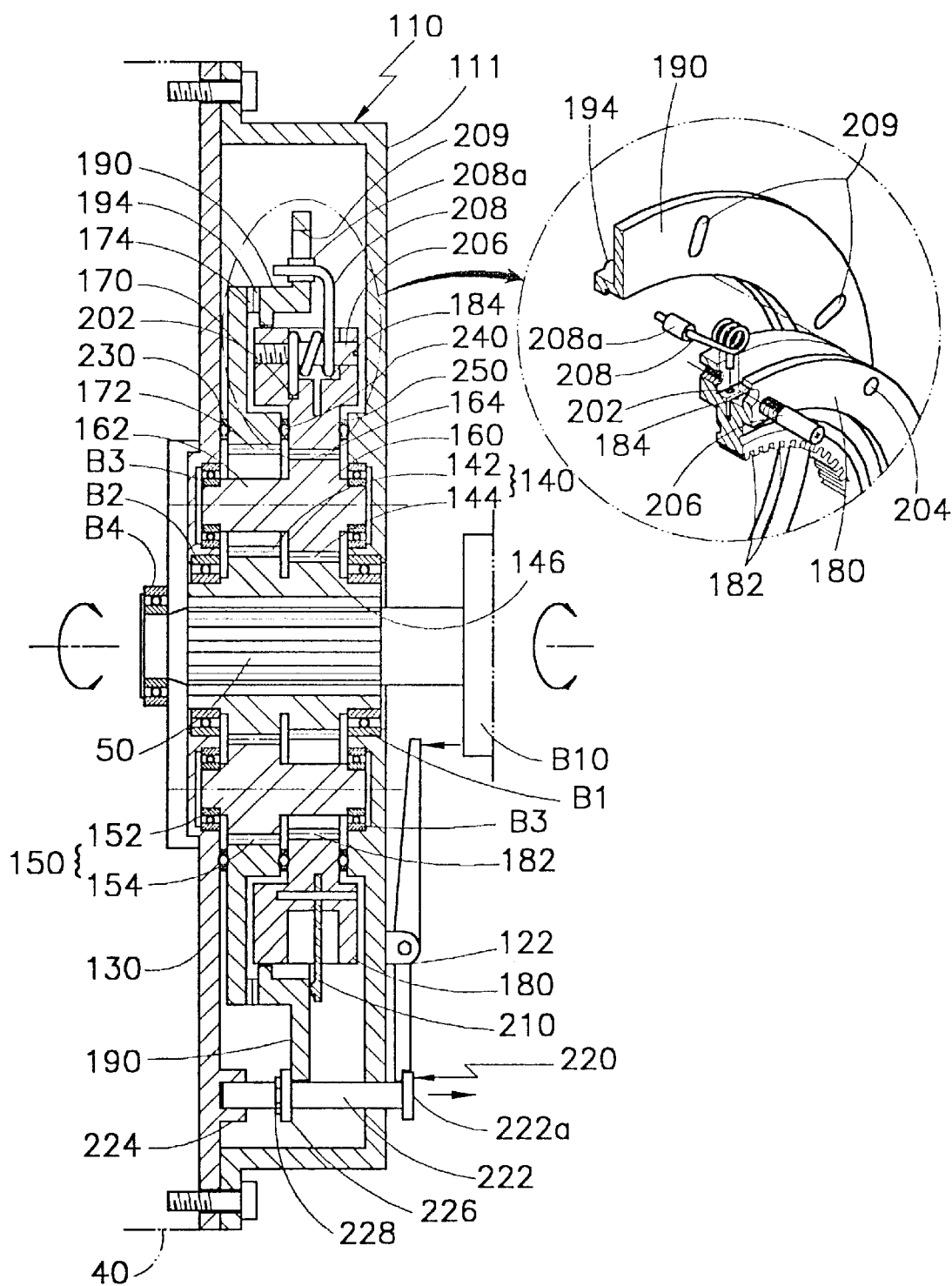
FIG. 4 is a partially enlarged cross-sectional view taken along the line A—A of FIG. 3, illustrating the car clutch in accordance with the first embodiment of the present invention.

As shown in FIGS. 2 through 4, a car clutch in accordance with a first embodiment of the present invention includes a clutch cover 110 mounted to a rear surface of a flywheel 40 which is integrally rotated with a crankshaft of an engine, and a clutch mechanism disposed in a space which is defined between the clutch cover 110 and the flywheel 40. In the car clutch according to the first embodiment of the present invention, power of the flywheel 40 is transmitted to a clutch shaft 50 by means of the clutch mechanism, and, when a driver depresses a clutch pedal, a release bearing B10 presses proximal ends of release levers 120 and, by virtue of lever actions of the release levers 120, power of the flywheel 40 is not transmitted to the clutch shaft 50.

The clutch mechanism includes a disc-shaped clutch base 130, a cylindrical output shaft 140, a pair of first planetary gear sections 150, and a pair of second planetary gear sections 160. The disc-shaped clutch base 130 is interposed between the flywheel 40 and the clutch cover 110 and is coupled to the flywheel 40 along with the clutch cover 110. The clutch base 130 is formed at a center portion thereof with a seating part 132 which projects in one direction toward the flywheel 40. The cylindrical output shaft 140 is rotatably fitted at one end thereof through the seating part 132 of the clutch base 130 and at the other end thereof through the clutch cover 110. The output shaft 140 has a first sun gear 142 and a second sun gear 144 which are integrally formed on a circumferential outer surface of the output shaft 140. The output shaft 140 further has spline grooves 146 which are defined on a circumferential inner surface of the cylindrical output shaft 140. The first and second sun gears 142 and 144 have different numbers of teeth or different modules. The pair of first planetary gear sections 150 are oppositely arranged to each other. Each first planetary gear section 150 possesses a first guide shaft 152 and a first planetary gear 154. The first guide shaft 152 has one end which is rotatably fitted through the seating part 132 of the clutch base 130 and the other end which is rotatably supported by the clutch cover 110. The first planetary gear 154 is integrally formed on a circumferential outer surface of the first guide shaft 152 and is meshed with the first sun gear 142 of the output shaft 140. The pair of second planetary gear sections 160 are oppositely arranged to each other. Each second planetary gear section 160 possesses a second guide shaft 162 and a second planetary gear 164. The second guide shaft 162 has one end which is rotatably fitted through the seating part 132 of the clutch base 130 and the other end which is rotatably supported by the clutch cover 110. The second planetary gear 164 is integrally formed on a circumferential outer surface of the second guide shaft 162 and is meshed with the second sun gear 144 of the output shaft 140.

The clutch mechanism further includes a first rotating member 170, a second rotating member 180 and a third rotating member 190 each of which has an annular plate-shaped configuration. The first rotating member 170 is rotatably brought into contact at one surface thereof with the clutch base 130 by the medium of a first thrust bearing 230. The first rotating member 170 has a first internal ring gear 172 and a first connecting part 174. The first internal ring gear 172 is formed on a circumferential inner edge of the first rotating member 170 and is meshed with first planetary gears 154 of the pair of first planetary gear sections 150. The first connecting part 174 is formed on the other surface of the first rotating member 170 adjacent to a circumferential outer edge of the first rotating member 170. The first connecting part 174 has a plurality of first corrugations which axially project from a plane of the first rotating member 170 to extend in the other direction toward the clutch cover 110. The second rotating member 180 is rotatably brought into contact at one surface thereof with the other surface of the first rotating member 170 by the medium of a second thrust bearing 240 and at the other surface thereof with the clutch cover 110 by the medium of a third thrust bearing 250. The second rotating member 180 has a second internal ring gear 182 and a circumferential recess 184. The second internal ring gear 182 is formed on a circumferential inner edge of the second rotating member 180 and is meshed with second planetary gears 164 of the pair of second planetary gear sections 160. The circumferential recess 184 is defined along an axial middle portion of a circumferential outer edge of the second rotating member 180. The third rotating member 190 has a boss 192 which is integrally formed along a circumferential inner edge of the third rotating member 190 in a manner such that the boss 192 axially projects from a plane of the third rotating member 190 to extend in the one direction toward the clutch base 130. The boss 192 has a second connecting part 194 and a circumferential guide projection 196. The second connecting part 194 is formed on a free end surface of the boss 192 and has a plurality of second corrugations which axially project from the free end surface of the boss 192 to extend in the one direction toward the clutch base 130 in a manner such that the second corrugations are meshed with the first corrugations of the first rotating member 170. The circumferential guide projection 196 is formed on a circumferential inner surface of the boss 192 to extend in a radial direction and is brought into sliding contact with the circumferential outer edge of the second rotating member 180.

The clutch mechanism still further includes semi-clutch means 200, a plurality of elastic clutching members 210, and a plurality of disengaging members 220. The semi-clutch means 200 have one ends which are connected to the third rotating member 190 and the other ends which are connected to the second rotating member 180, so as to enable a semi-clutching operation of the clutch to be implemented. The plurality of elastic clutching members 210 have one ends which are fitted into the circumferential recess 184 of the second rotating member 180 and the other ends which elastically bias the third rotating member 190 in the one direction toward the clutch base 130. The plurality of disengaging members 220 are inserted through the clutch cover 110 and are moved in the other direction toward the clutch cover 110 when external force is applied to the proximal ends of the release levers 120, thereby to disengage the third rotating member 190 from the first rotating member 170.

The first and second sun gears 142 and 144, the first and second planetary gears 154 and 164, and the first and second ring gears 172 and 182 have different numbers of teeth or different modules, in a manner such that a rotating velocity of the second rotating member 180 is less than that of the first rotating member 170.

In the meanwhile, in the car clutch according to the first embodiment of the present invention, constructed as mentioned above, the clutch cover 110 has substantially a cylindrical configuration which is opened at one end thereof and closed at the other end thereof. An outward flange portion 112 is formed on a circumferential outer surface of the clutch cover 110 at the one end which faces the flywheel 40. A center hole 114 through which the clutch shaft 50 is inserted, is defined through a center portion of a closed surface 111 of the clutch cover 110, and a plurality of perforations 116 through which the plurality of disengaging members 220 are inserted, respectively, are defined around the center hole 114 in the clutch cover 110. Planetary gear supporting bosses 118 on which the other ends of the first and second guide shafts 152 and 162 of the first and second planetary gear sections 150 and 160 are rested, respectively, are projectedly formed on an inner surface of the clutch cover 110.

Each release lever 120 is configured in a manner such that a hinge which is integrally formed with a lever portion 124 of the release lever 120, is rotatably coupled to a pair of shaft supporting protrusions 122 which are projectedly formed on the closed surface 111 of the clutch cover 110.

As described above, the seating part 132 is formed at the center portion of the clutch base 130 in a manner such that the seating part 132 projects in the direction toward the flywheel 40. An output shaft inserting hole 134 through which the one end of the output shaft 140 is rotatably inserted, is defined at a center portion of the seating part 132. Guide shaft inserting holes 136 through which the one ends of the first and second guide shafts 152 and 162 are inserted, respectively, are defined around the output shaft inserting hole 134 in the seating part 132 of the clutch base 130.

The other end of the output shaft 140 is rotatably supported by a bearing B1 which is fitted into the center hole 114 of the clutch cover 110, and the one end of the output shaft 140 is rotatably supported by a bearing B2 which is fitted into the output shaft inserting hole 134 defined in the seating part 132 of the clutch base 130.

While it is illustrated in FIGS. 2 through 4 that the car clutch according to the first embodiment of the present invention has the pair of first planetary gear sections 150 and the pair of second planetary gear sections 160, a person skilled in the art will recognize that the car clutch can include two or more pairs of first planetary gear sections and two or more pairs of second planetary gear sections while not departing from a technical concept defined by the present invention. Both ends of the first and second guide shifts 152 and 162 are rotatably supported by bearings B3 which are fitted into the guide shaft inserting holes 136 of the seating part 132 and the planetary gear supporting bosses 118 of the clutch cover 110.

Each semi-clutch means 200 includes a fitting groove 202, a fixing pin inserting bore 204, a fixing pin 206, a torsion spring 208, and a guide slot 209. The fitting groove 202 is defined in a bottom of the circumferential recess 184 of the second rotating member 180 in such a manner that it extends in the radial direction. The fixing pin inserting bore 204 is defined through the second rotating member 180 in such a manner that it extends in an axial direction while being communicated with the circumferential recess 184. The fixing pin 206 is inserted through the fixing pin inserting bore 204. The torsion spring 208 is wound around the fixing pin 206, and has one end which is fitted into the fitting groove 202 and the other end around which a bushing 208a is fitted. The guide slot 209 is defined in the third rotating member 190 in a manner such that it extends in the radial direction. The other end of the torsion spring 208 is inserted into the guide slot 209 to be slidably moved therein.

A threaded portion is formed on a circumferential outer surface of the fixing pin 206 and adjacent to one end of the fixing pin 206, and a tool inserting groove is defined at the other end of the fixing pin 206.

Each elastic clutching member 210 has a configuration of substantially a 180° rotated T-shaped plate. A proximal end of the elastic clutching member 210 is secured inside the circumferential recess 184 of the second rotating member 180 by two pins, and a distal end of the elastic clutching member 210 is formed with a projection which is elastically engaged with an outer surface of the third rotating member 190.

Each disengaging member 220 includes a pull rod 222, a pull rod-inserting boss 224, a pressing ring 226, and a release-preventing ring 228. The pull rod 222 is inserted through the perforation 116 which is defined in the clutch cover 110. The pull rod 222 is formed at one end thereof with a head portion 222a which is grasped by a distal end of the release lever 120, and is defined adjacent to the other end thereof with a circumferential groove 222b. The pull rod-inserting boss 224 is formed on the clutch base 130 in a manner such that the other end of the pull rod 222 is inserted therein. The pressing ring 226 is fitted around the pull rod 222 to be brought into contact with an inner surface of the third rotating member 190 adjacent to a circumferential outer edge of the third rotating member 190. The release-preventing ring 228 is fitted into the circumferential groove 222b to prevent the pressing ring 226 from being released from the pull rod 222.

Each of the first through third thrust bearings 230, 240 and 250 is configured in a manner such that a plurality of balls are fitted into a plurality of holes, respectively, which are defined in a circular ball supporting ring. Each of the inner surface of the clutch base 130, inner and outer surfaces of the first rotating member 170, inner and outer surfaces of the second rotating member 180, and the inner surface of the clutch cover 110 on which balls are seated, are formed with a ball seating groove 260.

In FIGS. 2 through 4, the drawing reference numeral B4 represents a pilot bearing by which one end of the clutch shaft 50 is supported.

Hereinafter, operations of the car clutch according to the first embodiment of the present invention will be described in detail.

As shown in FIGS. 3 and 4, when the clutch mechanism including the clutch cover 110 which is mounted to the rear surface of the flywheel 40 which in turn is integrally rotated with the crankshaft of the engine, is rotated, the clutch shaft 50 is supported by the pilot bearing B4 and a bearing of a transmission and is integrally rotated with a driving gear of the transmission.

Describing this procedure in further detail, initially, when a motor vehicle runs in a state wherein a driver does not depress a clutch pedal, the first planetary gears 154 are meshed with the first internal ring gear 172, and the second planetary gears 164 are meshed with the second internal ring gear 182. Because the third rotating member 190 is pressed by elastic force of the elastic clutching members 210 which are secured to the second rotating member 180, the second corrugations of the second connecting part 194 of the third rotating member 190 are meshed with the first corrugations of the first connecting part 174 of the first rotating member 170, whereby the first through third rotating members 170, 180 and 190 are integrally and rigidly coupled one with another. The first and second planetary gears 154 and 164 are revolved around the first and second sun gears 142 and 144, respectively, due to the fact that their guide shafts 152 and 162 are rotatably supported at both ends thereof by the clutch base 320 and the clutch cover 310, respectively. Therefore, since the first through third rotating members 170, 180 and 190 are integrally and rigidly coupled one with another, as power of the flywheel 40 is transferred to the first and second planetary gears 154 and 164 through the first and second internal ring gears 172 and 182, the first and second planetary gears 154 and 164 are rotated about their own axes, respectively. At this time, as described above, by the elastic force of the elastic clutching members 210, the third rotating member 190 is tightly squeezed against the first rotating member 170 and is fastened to the second rotating member 180 by the medium of the semi-clutch means 200 so as to be maintained in an integrally coupled state.

In other words, since the first through third rotating members 170, 180 and 190 are securely fastened one to another, the first and second planetary gear sections 150 and 160 rotate the output shaft 140, and thereby, as the clutch shaft 50 which is splined into the spline grooves 146 of the output shaft 140, is rotated, the rotating force of the flywheel 40 is transferred to the transmission through the clutch shaft 50.

On the other hand, in this state, if the driver depresses the clutch pedal to disconnect engine power flow to the transmission thereby to conduct a speed changing operation, as the release bearing B10 is moved toward the clutch cover 110 by depressing force of the clutch pedal, the release bearing B10 presses the proximal ends of the release levers 120, and, by virtue of lever actions of the release levers 120, distal ends of the release levers 120 pull the pull rods 222 of the disengaging members 220 toward the outside. Accordingly, as the pressing rings 226 which are fitted around the pull rods 222, force the third rotating member 190 to move in the other direction toward the clutch cover 110, the third rotating member 190 is disengaged from the first rotating member 170.

Hence, the first rotating member 170 and the second rotating member 180 are separated and freed from each other. Therefore, when the rotating force is transferred to the first and second guide shafts 152 and 162 from the clutch cover 110, the first and second planetary gears 154 and 164 are freely revolved around the first and second sun gears 142 and 144 and are freely rotated about their own axes while idly rotating the first rotating member 170 and the second rotating member 180 by their own rotating force.

That is to say, even though the rotating force of the flywheel 40 is transferred to the first and second planetary gear sections 150 and 160 by the medium of the clutch cover 110, because the first and second rotating members 170 and 180 are maintained in a state wherein they can be independently and idly rotated, no load is transferred to the output shaft 140, whereby engine power flow to the clutch shaft 50 is disconnected.

In this situation, the driver can manipulate a shift lever to conduct the speed changing operation. After the speed changing operation is completed, if the driver releases the clutch pedal, the release bearing B10 is moved in a direction in which the release bearing B10 is separated from the clutch cover 110, and, at the same time, the third rotating member 190 is returned to its original position by the elastic force of the elastic clutching members 210. Thereby, the pull rods 222 are biased to move in the one direction toward the clutch base 130, and the release levers 120 are also returned to their original positions.

Moreover, as the second corrugations of the second connecting part 194 of the third rotating member 190 are meshed with the first corrugations of the first connecting part 174 of the first rotating member 170, the rotating force of the flywheel 40 is transferred to the clutch shaft 50. At this time, as described above, due to the reduction gear ratio, since a rotating velocity of the first rotating member 170 is greater than that of the second rotating member 180, as can be readily seen from FIG. 3, as the torsion springs 208 of the semi-clutch means 200, which are inserted at the other ends thereof into the guide slots 209 of the third rotating member 190, respectively, are elastically deformed, power is gradually transferred to the second rotating member 180 within a predetermined speed, whereby semi-clutching capability can be accomplished as in the conventional manual clutch.

Namely, it is possible to prevent the engine from stopping or the motor vehicle from sliding on a slope way, which can be otherwise caused when the driver suddenly removes depressing force from the clutch pedal in a manual transmission vehicle and thereby the rotating force of the flywheel is rapidly transferred to the clutch shaft.

Figure 5:
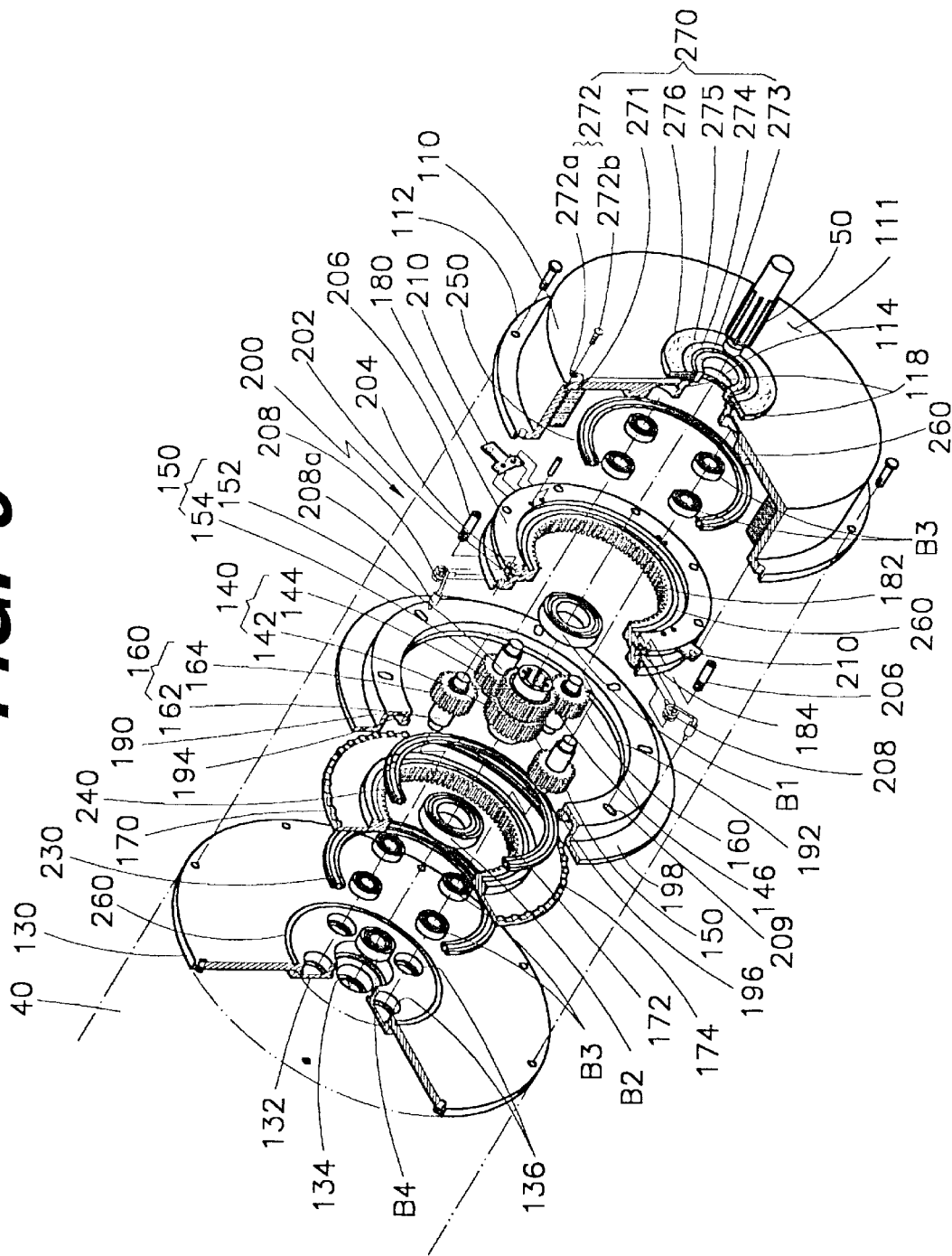
FIG. 5 is an exploded perspective view illustrating a car clutch in accordance with a second embodiment of the present invention.
Figure 6:
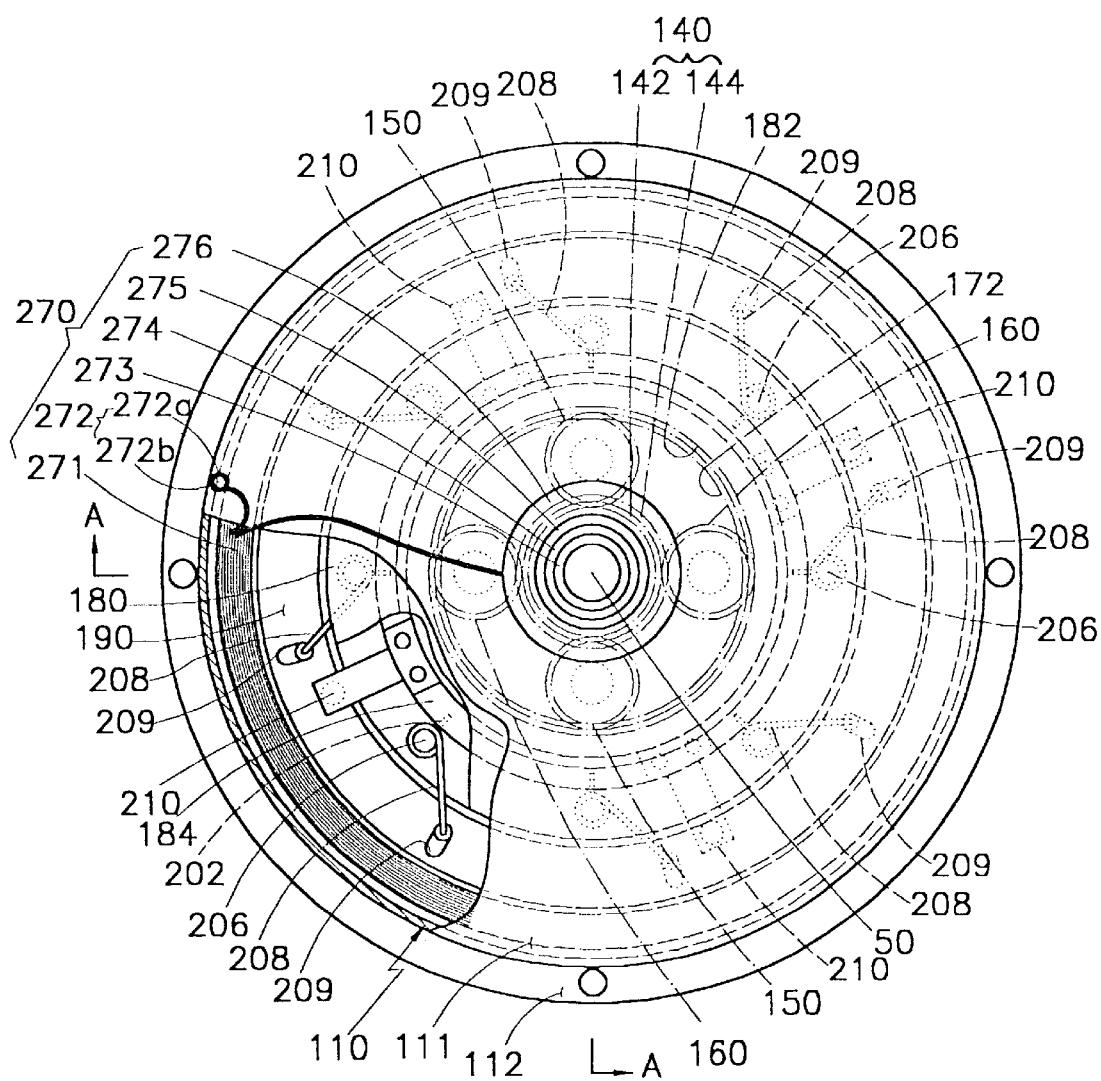
FIG. 6 is a partially broken-away schematic front view illustrating an operation of the car clutch in accordance with the second embodiment of the present invention.
Figure 7:
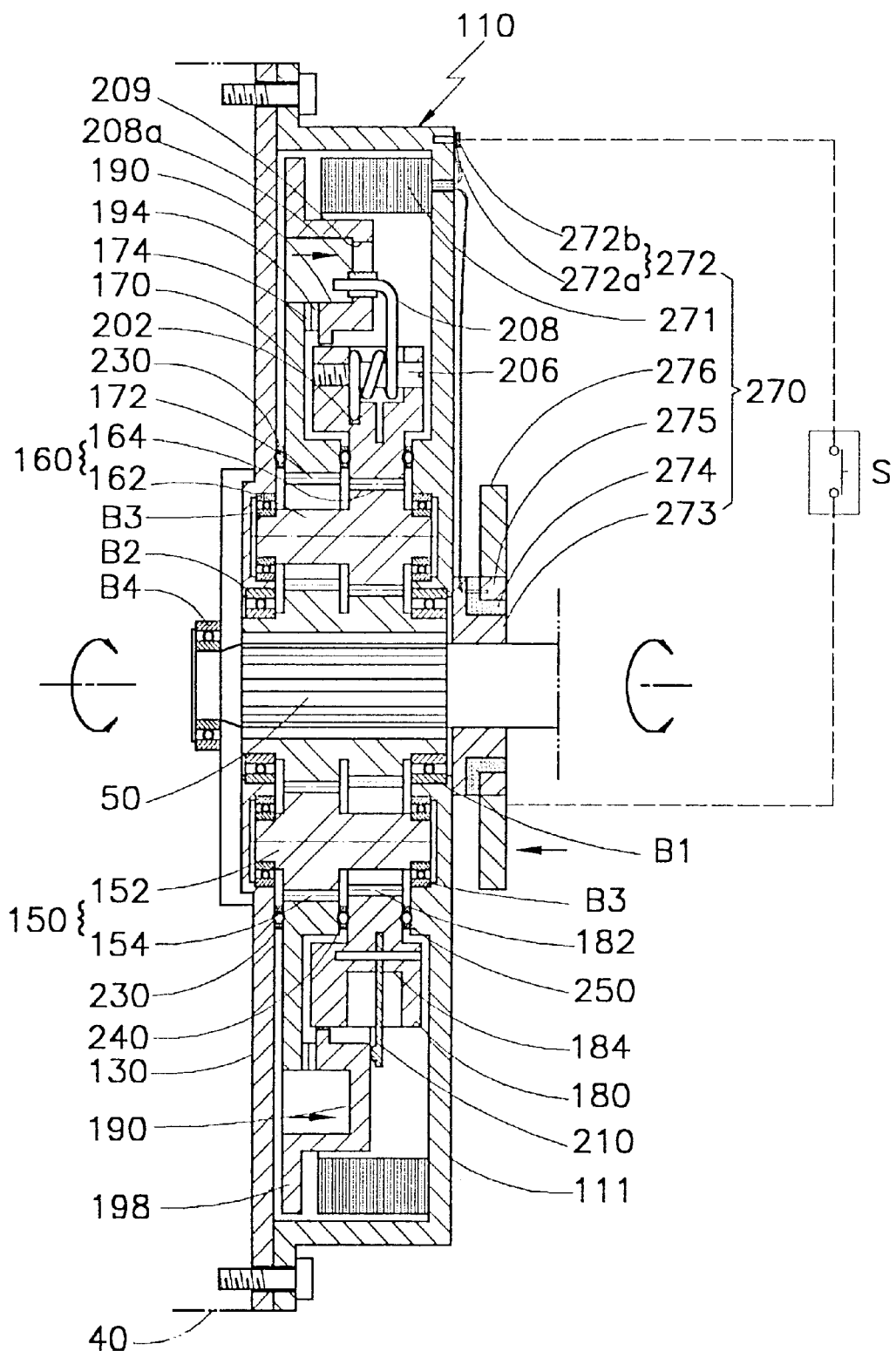
FIG. 7 is a cross-sectional view taken along the line A—A of FIG. 6, illustrating the car clutch in accordance with the second embodiment of the present invention.

FIG. 5 is an exploded perspective view illustrating a car clutch in accordance with a second embodiment of the present invention; FIG. 6 is a partially broken-away schematic front view illustrating an operation of the car clutch in accordance with the second embodiment of the present invention; and FIG. 7 is a cross-sectional view taken along the line A—A of FIG. 6, illustrating the car clutch in accordance with the second embodiment of the present invention. In this second embodiment of the present invention, the same drawing reference numerals will be used to designate the same parts as those in the first embodiment of the present invention.

As shown in FIGS. 5 through 7, in a car clutch in accordance with a second embodiment of the present invention, a clutch cover 110 is mounted to a rear surface of a flywheel 40 which is integrally rotated with a crankshaft of an engine. Power of the flywheel 40 is transmitted to a clutch shaft 50 by means of a clutch mechanism which is disposed inside the clutch cover 110, and, when a driver depresses a switch button S, power of the flywheel 40 is not transmitted to the clutch shaft 50. The clutch mechanism includes a disc-shaped clutch base 130, a cylindrical output shaft 140, a pair of first planetary gear sections 150, and a pair of second planetary gear sections 160. The disc-shaped clutch base 130 is interposed between the flywheel 40 and the clutch cover 110 and is coupled to the flywheel 40 along with the clutch cover 110. The clutch base 130 is formed at a center portion thereof with a seating part 132 which projects in one direction toward the flywheel 40. The cylindrical output shaft 140 is rotatably fitted at one end thereof through the seating part 132 of the clutch base 130 and at the other end thereof through the clutch cover 110. The output shaft 140 has a first sun gear 142 and a second sun gear 144 which are integrally formed on a circumferential outer surface of the output shaft 140. The output shaft 140 further has spline grooves 146 which are defined on a circumferential inner surface of the cylindrical output shaft 140. The first and second sun gears 142 and 144 have different numbers of teeth or different modules. The pair of first planetary gear sections 150 are oppositely arranged to each other. Each first planetary gear section 150 possesses a first guide shaft 152 and a first planetary gear 154. The first guide shaft 152 has one end which is rotatably fitted through the seating part 132 of the clutch base 130 and the other end which is rotatably supported by the clutch cover 110. The first planetary gear 154 is integrally formed on a circumferential outer surface of the first guide shaft 152 and is meshed with the first sun gear 142 of the output shaft 140. The pair of second planetary gear sections 160 are oppositely arranged to each other. Each second planetary gear section 160 possesses a second guide shaft 162 and a second planetary gear 164. The second guide shaft 162 has one end which is rotatably fitted through the seating part 132 of the clutch base 130 and the other end which is rotatably supported by the clutch cover 110. The second planetary gear 164 is integrally formed on a circumferential outer surface of the second guide shaft 162 and is meshed with the second sun gear 144 of the output shaft 140.

The clutch mechanism further includes a first rotating member 170, a second rotating member 180 and a third rotating member 190 each of which has an annular plate-shaped configuration. The first rotating member 170 is rotatably brought into contact at one surface thereof with the clutch base 130 by the medium of a first thrust bearing 230. The first rotating member 170 has a first internal ring gear 172 and a first connecting part 174. The first internal ring gear 172 is formed on a circumferential inner edge of the first rotating member 170 and is meshed with first planetary gears 154 of the pair of first planetary gear sections 150. The first connecting part 174 is formed on the other surface of the first rotating member 170 adjacent to a circumferential outer edge of the first rotating member 170. The first connecting part 174 has a plurality of first corrugations which axially project from a plane of the first rotating member 170 to extend in the other direction toward the clutch cover 110. The second rotating member 180 is rotatably brought into contact at one surface thereof with the other surface of the first rotating member 170 by the medium of a second thrust bearing 240 and at the other surface thereof with the clutch cover 110 by the medium of a third thrust bearing 250. The second rotating member 180 has a second internal ring gear 182 and a circumferential recess 184. The second internal ring gear 182 is formed on a circumferential inner edge of the second rotating member 180 and is meshed with second planetary gears 164 of the pair of second planetary gear sections 160. The circumferential recess 184 is defined along an axial middle portion of a circumferential outer edge of the second rotating member 180. The third rotating member 190 has a boss 192 which is integrally formed along a circumferential inner edge of the third rotating member 190 in a manner such that the boss 192 axially projects from a plane of the third rotating member 190 to extend in the one direction toward the clutch base 130. The boss 192 has a second connecting part 194 and a circumferential guide projection 196. The second connecting part 194 is formed on a free end surface of the boss 192 and has a plurality of second corrugations which axially project from the free end surface of the boss 192 to extend in the one direction toward the clutch base 130 in a manner such that the second corrugations are meshed with the first corrugations of the first rotating member 170. The circumferential guide projection 196 is formed on a circumferential inner surface of the boss 192 to extend in a radial direction and is brought into sliding contact with the circumferential outer edge of the second rotating member 180. The third rotating member 190 further has a magnetic plate portion 198 which is integrally coupled to a circumferential outer edge of the third rotating member 190.

The clutch mechanism still further includes semi-clutch means 200, a plurality of elastic clutching members 210, and an electromagnetic device 270. The semi-clutch means 200 have one ends which are connected to the third rotating member 190 and the other ends which are connected to the second rotating member 180, so as to enable a semi-clutching operation of the clutch to be implemented. The plurality of elastic clutching members 210 have one ends which are fitted into the circumferential recess 184 of the second rotating member 180 and the other ends which elastically bias the third rotating member 190 in the one direction toward the clutch base 130. The electromagnetic device 270 is configured to attract the third rotating member 190 when current is supplied thereto through manipulation of the switch button S.

In the car clutch according to the second embodiment of the present invention, constructed as mentioned above, the electromagnetic device 270 includes an electromagnetic ring 271, a ground member 272, a guide boss 273, an insulating ring 274, a first brush member 275 and a second brush member 276. The electromagnetic ring 271 is installed on an inner surface of the clutch cover 110 in a manner such that the electromagnetic ring 271 is opposite to the magnetic plate portion 198 of the third rotating member 190. The ground member 272 is locked to an outer surface of the clutch cover 110 and is connected to the electromagnetic ring 271 via a first terminal cable having a negative polarity. The guide boss 273 is fastened to the clutch cover 110 around a center hole 114 of the clutch cover 110, through which the clutch shaft 50 is fitted. The insulating ring 274 is fitted around the guide boss 273. The first brush member 275 is fitted around the insulating ring 274 in a manner such that the first brush member 275 is integrally rotated with the insulating ring 274. The first brush member 275 is connected to the electromagnetic ring 271 via a second terminal cable having a positive polarity. The second brush member 276 is fitted around the first brush member 275 in a manner such that the second brush member 276 is fixedly maintained with respect to the first brush member 275 while the first brush member 275 is rotated. The second brush member 276 is connected to the switch button S via a cable.

The ground member 272 comprises a washer 272a to which the first terminal cable having the negative polarity is connected, and a bolt 272b which passes through the washer 272a and is locked to the clutch cover 110.

Due to the fact that the first brush member 275 has a rotatable structure, the second brush member 276 which is fitted around the first brush member 275, can be held fixed, whereby the cable which is connected to the second brush member 276, is prevented from being entangled.

The magnetic plate portion 198 of the third rotating member 190 extends in the radial and circumferential directions on the circumferential outer edge of the third rotating member 190 in such a way as to have substantially an L-shaped cross-section.

Hereinafter, operations of the car clutch according to the second embodiment of the present invention will be described in detail.

In a state wherein a motor vehicle runs at a predetermined speed, the first planetary gears 154 are meshed with the first internal ring gear 172, and the second planetary gears 164 are meshed with the second internal ring gear 182. Because the third rotating member 190 is pressed by elastic force of the elastic clutching members 210 which are secured to the second rotating member 180, the second corrugations of the second connecting part 194 of the third rotating member 190 are meshed with the first corrugations of the first connecting part 174 of the first rotating member 170, whereby the first through third rotating members 170, 180 and 190 are integrally and rigidly coupled one with another. The first and second planetary gears 154 and 164 are revolved around the first and second sun gears 142 and 144, respectively, due to the fact that their guide shafts 152 and 162 are rotatably supported at both ends thereof by the clutch base 320 and the clutch cover 310, respectively. Therefore, since the first through third rotating members 170, 180 and 190 are integrally and rigidly coupled one with another, as power of the flywheel 40 is transferred to the first and second planetary gears 154 and 164 through the first and second internal ring gears 172 and 182, the first and second planetary gears 154 and 164 are rotated about their own axes, respectively. At this time, as described above, by the elastic force of the elastic clutching members 210, the third rotating member 190 is tightly squeezed against the first rotating member 170 and is fastened to the second rotating member 180 by the medium of the semiclutch means 200 so as to be maintained in an integrally coupled state.

In other words, since the first through third rotating members 170, 180 and 190 are securely fastened one to another, the first and second planetary gear sections 150 and 160 rotate the output shaft 140, and thereby, as the clutch shaft 50 which is splined into the spline grooves 146 of the output shaft 140, is rotated, the rotating force of the flywheel 40 is transferred to the transmission through the clutch shaft 50.

On the other hand, in this state, if the driver manipulates the switch button S thereby to conduct a speed changing operation, as current is supplied to the electromagnetic ring 271, a strong magnetic field is created to attract the magnetic plate portion 198 of the third rotating member 190. By this, as the third rotating member 190 is moved toward the clutch cover 110, the third rotating member 190 is disengaged from the first rotating member 170.

Hence, the first rotating member 170 and the second rotating member 180 are separated and freed from each other. Therefore, when the rotating force is transferred to the first and second guide shafts 152 and 162 from the clutch cover 110, the first and second planetary gears 154 and 164 are revolved around the first and second sun gears 142 and 144 and are rotated about their own axes while idly rotating the first rotating member 170 and the second rotating member 180 by their own rotating force.

That is to say, even though the rotating force of the flywheel 40 is transferred to the first and second planetary gear sections 150 and 160 by the medium of the clutch base 130 and the clutch cover 110, because the first and second rotating members 170 and 180 are maintained in a state wherein they can be independently and idly rotated, no load is transferred to the output shaft 140, whereby engine power flow to the clutch shaft 50 is disconnected.

In this situation, the driver can freely maneuver a shift lever to conduct the speed changing operation. After the speed changing operation is completed, if the driver releases the switch button S, current supply to the electromagnetic ring 271 is interrupted, and, thereby, the third rotating member 190 is returned to its original position by the elastic force of the elastic clutching members 210. Therefore, as the second corrugations of the second connecting part 194 of the third rotating member 190 are meshed with the first corrugations of the first connecting part 174 of the first rotating member 170, the rotating force of the flywheel 40 is transferred to the clutch shaft 50. At this time, as described above, since a rotating velocity of the first rotating member 170 is greater than that of the second rotating member 180, as can be readily seen from FIG. 6, as the torsion springs 208 of the semi-clutch means 200, which are inserted at the other ends thereof into the guide slots 209 of the third rotating member 190, respectively, are elastically deformed, power is gradually transferred to the second rotating member 180 in a state wherein a portion of a torque is absorbed by the torsion springs 208 to some extent, whereby semi-clutching capability can be accomplished as in a manual clutch.

Namely, it is possible to prevent the engine from stopping or the motor vehicle from sliding on a slope way, which can be otherwise caused when the driver suddenly removes depressing force from the clutch pedal in a manual transmission vehicle and thereby the rotating force of the flywheel is rapidly transferred to the clutch shaft.

The car clutch according to the second embodiment of the present invention provides advantages in that, since the car clutch is actuated not through the depression of the clutch pedal by the foot but through the manipulation of the switch button S by the hand, a complex actuating arrangement including the clutch pedal, a release fork, a release lever, and so forth are not necessary, whereby an entire structure of the car clutch can be simplified and manufacturing cost can be reduced. Also, because a clutch operation is effected by the switch button S, manipulability of the car clutch is improved and reliable operation of the car clutch is ensured. More particularly, the car clutch can be easily applied to a motor vehicle for a handicapped person.

Figure 8:
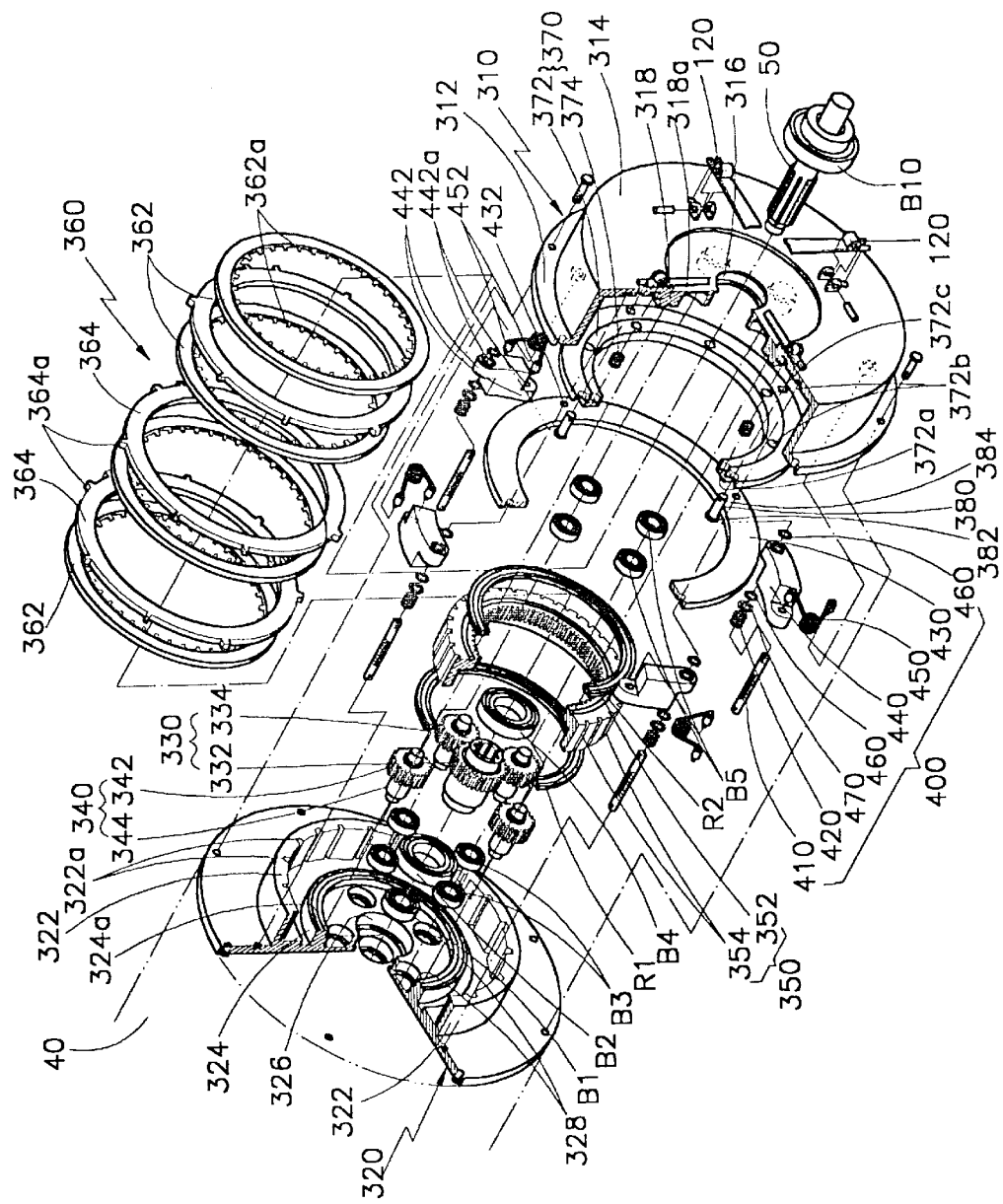
FIG. 8 is an exploded perspective view illustrating a car clutch in accordance with a third embodiment of the present invention.
Figure 9:
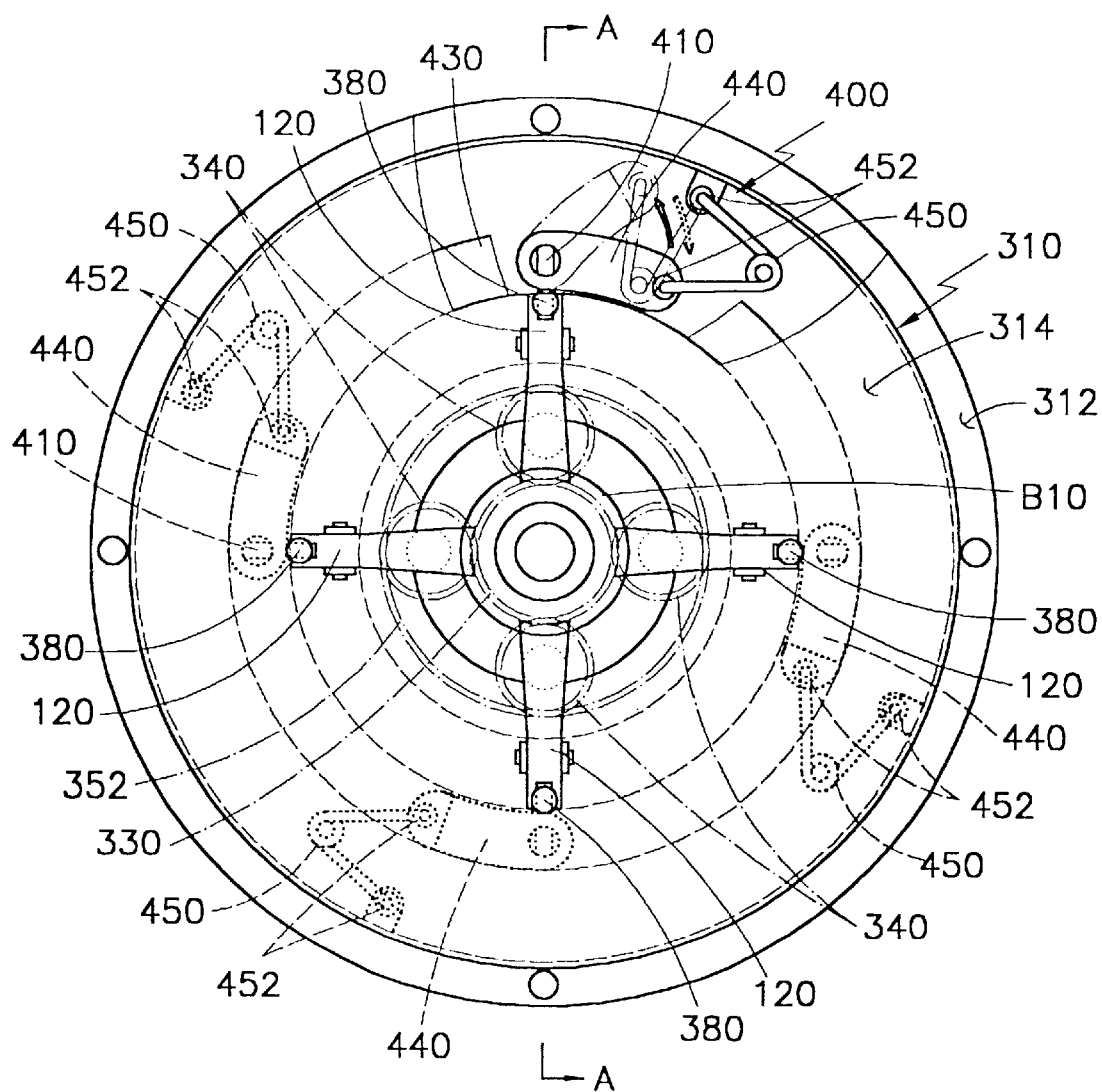
FIG. 9 is a partially broken-away schematic front view illustrating an operation of the car clutch in accordance with the third embodiment of the present invention.
Figure 10:
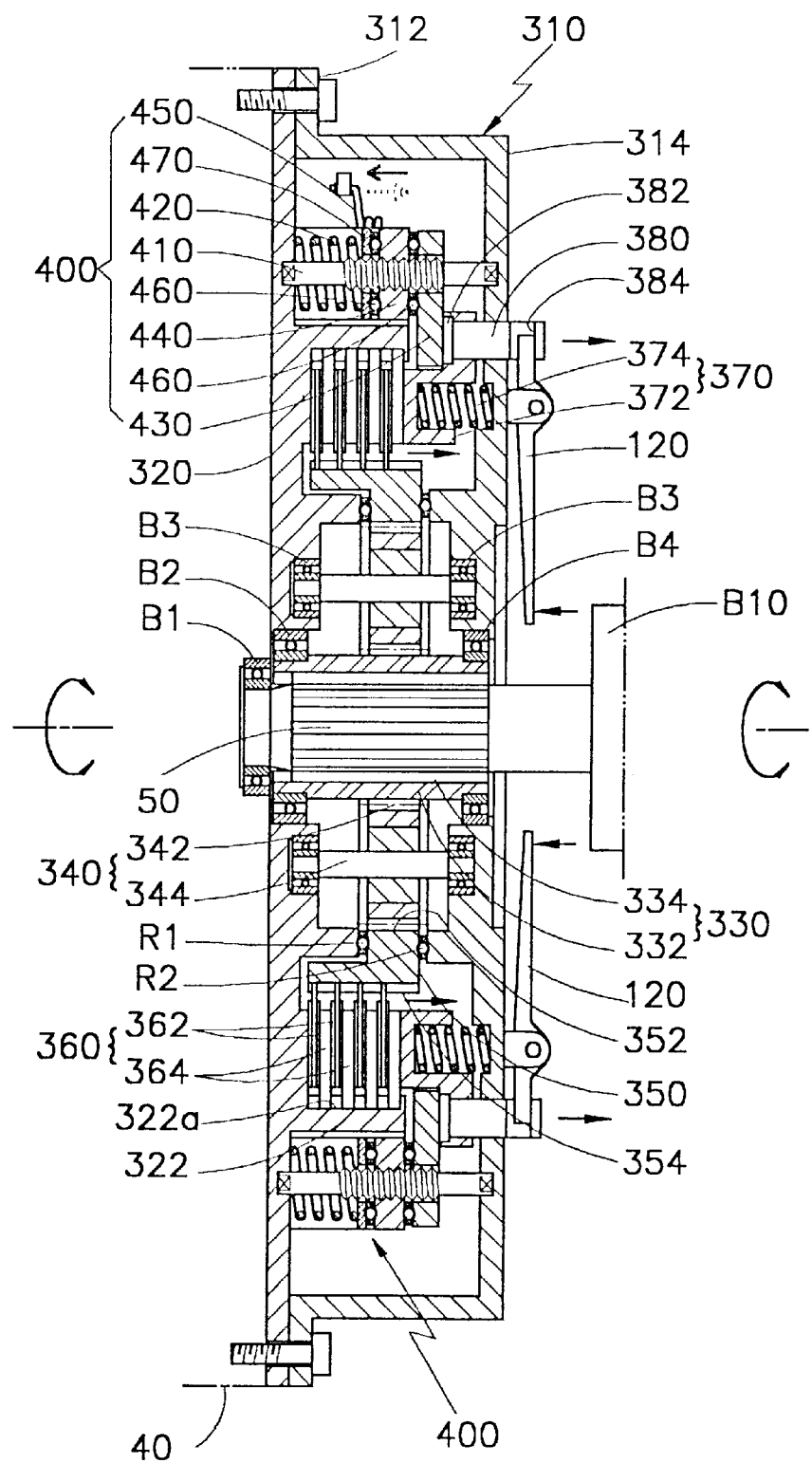
FIG. 10 is a cross-sectional view taken along the line A—A of FIG. 9, illustrating the car clutch in accordance with the third embodiment of the present invention.

FIG. 8 is an exploded perspective view illustrating a car clutch in accordance with a third embodiment of the present invention; FIG. 9 is a partially broken-away schematic front view illustrating an operation of the car clutch in accordance with the third embodiment of the present invention; and FIG. 10 is a cross-sectional view taken along the line A—A of FIG. 9, illustrating the car clutch in accordance with the third embodiment of the present invention. In this third embodiment of the present invention, the same drawing reference numerals will be used to designate the same parts as those in the first embodiment of the present invention.

As shown in FIGS. 8 through 10, a car clutch in accordance with a third embodiment of the present invention includes a clutch base 320 and a clutch cover 310 which are coupled to a rear surface of a flywheel 40 which is integrally rotated with a crankshaft of an engine, an output shaft 330 which is rotatably fitted through the clutch base 320 and the clutch cover 310, a plurality of planetary gear sections 340 which are operatively connected with the output shaft 330, a rotating member 350 which is operatively connected with the plurality of planetary gear sections 340, a multiple disc clutch member 360 which is fitted around the rotating member 350, a pressing member 370 which elastically biases the multiple disc clutch member 360 in one direction toward the clutch base 320, a plurality of pull rods 380 which pull the pressing member 370 in the other direction toward the clutch cover 310 to separate the pressing member 370 from the multiple disc clutch member 360, and pressure adjusting means 400 which is pivotally rotated by centrifugal force which is generated due to rotation of the flywheel 40, so as to adjust a pressure which is applied to the multiple disc clutch member 360. In the car clutch, when an engine RPM is low, power of the flywheel 40 is transmitted to a clutch shaft 50 in a flimsy manner, thereby enabling a semi-clutching operation to be implemented, and, when an engine RPM is higher than a predetermined value, power of the flywheel 40 is fully transmitted to the clutch shaft 50 in an intensive manner. If a driver depresses a clutch pedal to conduct a speed changing operation, a release bearing B10 presses proximal ends of release levers 120. Thereafter, by virtue of lever actions of the release levers 120, the plurality of pull rods 380 are pulled toward the clutch cover 310, and power of the flywheel 40 is not transmitted to the clutch shaft 50.

The clutch cover 310 has substantially a cylindrical configuration which is opened at one end thereof and closed at the other end thereof. An outward flange portion 312 at which the clutch cover 310 is coupled to the flywheel 40, is formed on a circumferential outer surface of the clutch cover 310 at the one end which faces the flywheel 40. A center hole 316 through which the clutch shaft 50 is inserted, is defined through a center portion of a closed surface 314 of the clutch cover 310. Planetary gear supporting bosses 318 having shaft inserting holes 318a into which the other ends of the plurality of planetary gear sections 340 are fitted, are projectedly formed on an inner surface of the clutch cover 310.

The clutch base 320 possesses a disc-shaped configuration. The clutch base 320 is interposed between the flywheel 40 and the clutch cover 310 and is coupled to the flywheel 40 along with the clutch cover 310. The clutch base 320 has a cylindrical supporting boss 322 which is projectedly formed on an inner surface of the clutch base 320. The cylindrical supporting boss 322 has first spline grooves 322a which are defined on a circumferential inner surface of the cylindrical supporting boss 322. The clutch base 320 further has a ring-shaped bearing supporting boss 324 which is projectedly formed on the inner surface of the clutch base 320 inward of the cylindrical supporting boss 322. A ball seating groove 324a is defined on a free end surface of the bearing supporting boss 324. An output shaft inserting hole 326 through which one end of the output shaft 330 is inserted, is defined at a center portion of the clutch base 320 inside the bearing supporting boss 324. Shaft inserting holes 328 through which one ends of the plurality of planetary gear sections 340 are inserted, are defined around the output shaft inserting hole 326 inside the bearing supporting boss 324.

The output shaft 330 possesses substantially a cylindrical configuration. One end of the output shaft 330 is inserted through the output shaft inserting hole 326 of the clutch base 320, and the other end of the output shaft 330 is rotatably fitted through the clutch cover 310. A sun gear 332 is formed on a circumferential outer surface of the output shaft 330, and second spline grooves 334 are defined on a circumferential inner surface of the output shaft 330.

The one end of the output shaft 330 is supported by a bearing B2 which is fitted into the output shaft inserting hole 326 of the clutch base 320, and the other end of the output shaft 330 is supported by a bearing B4 which is fitted into the center hole 316 defined in the clutch cover 310.

Each of the plurality of planetary gear sections 340 possesses a guide shaft 344 and a planetary gear 342. The guide shaft 344 has one end which is rotatably fitted through the shaft inserting hole 328 of the clutch base 320 and the other end which is rotatably fitted through the shaft inserting hole 318a of the clutch cover 310. The planetary gear 342 is integrally formed on a circumferential outer surface of the guide shaft 344 and is meshed with the sun gear 332 of the output shaft 330.

The one end of the guide shaft 344 of each planetary gear section 340 is supported by a bearing B3 which is fitted into the shaft inserting hole 328 of the clutch base 320, and the other end of the guide shaft 344 is supported by a bearing B5 which is fitted into the shaft inserting hole 318a of the clutch cover 310.

While four planetary gear sections 340 are provided in this embodiment, a person skilled in the art will readily appreciate that two or more planetary gear sections can be properly used without departing from the scope of the present invention.

The rotating member 350 possesses substantially a cylindrical configuration. The rotating member 350 has an internal ring gear 352 and third spline grooves 354. The internal ring gear 352 is formed on a circumferential inner surface of the rotating member 350 and is meshed with planetary gears 342 of the plurality of planetary gear sections 340. The third spline grooves 354 are defined on a circumferential outer surface of the rotating member 350.

The multiple disc clutch member 360 has a plurality of inner plates 362 which are fitted around the rotating member 350 and a plurality of outer plates 364 which are fitted into the cylindrical supporting boss 322 of the clutch base 320 and each of which is intervened between two adjoining inner plates 362. Each inner plate 362 has spline teeth 362a which are formed on a circumferential inner surface thereof and are splined into the third spline grooves 354 of the rotating member 350. Each outer plate 364 has spline teeth 364a which are formed on a circumferential outer surface thereof and are splined into the first spline grooves 322a of the cylindrical supporting boss 322.

The pressing member 370 is disposed between the multiple disc clutch member 360 and the clutch cover 310 for elastically biasing the multiple disc clutch member 360 in the one direction toward the clutch base 320 in a manner such that the inner plates 362 and the outer plates 364 are brought into tight contact one with another and thereby are locked one to another. The pressing member 370 includes a pressure plate 372 and a plurality of springs 374. The pressure plate 372 possesses substantially an annular plate-shaped configuration. The pressure plate 372 has a pressing part 372a which is bent from a plane of the pressure plate 372 to be brought into contact with the multiple disc clutch member 360. The pressing part 372a defines a plurality of spring receiving grooves 372b on a surface thereof which is opposed to the multiple disc clutch member 360. The pressure plate 372 is formed with a plurality of pull rod inserting holes 372c through which the plurality of pull rods 380 are inserted, respectively. The plurality of springs 374 are inserted into the plurality of spring receiving grooves 372b, respectively.

Each spring 374 comprises a compression coil spring.

The plurality of pull rods 380 are inserted through the clutch cover 310. The plurality of pull rods 380 have one ends which are coupled to distal ends of the release levers 120 and the other ends which are fastened to the pressure plate 372 of the pressing member 370. When external force is applied to the proximal ends of the release levers 120, the pull rods 380 are moved in the other direction toward the clutch cover 310, thereby to separate the pressure plate 372 of the pressing member 370 from the multiple disc clutch member 360. In its detail configuration, each pull rod 380 has one end which is formed as a head portion 382 and the other end which is formed with an engaging projection 384.

The pressure adjusting means 400 is arranged in a circumferential space which is defined between the clutch base 320 and the clutch cover 310, in a manner such that each pressure adjusting means 400 is capable of pivoting movement for adjusting a pressure which is applied to the multiple disc clutch member 360 by the pressing member 370, depending upon a magnitude of centrifugal force which is generated by rotation of the flywheel 40.

Each pressure adjusting means 400 includes a support bar 410, a compression spring 420, a bearing-supporting ring 470, an adjusting ring 430, a balancing weight 440, an elastic member 450, and a pair of guide bearings 460. The support bar 410 is fastened at both ends thereof to the clutch base 320 and the clutch cover 310, respectively. The support bar 410 has an externally threaded portion which is formed on a circumferential outer surface and at a middle portion of the support bar 410. The compression spring 420 is fitted around the support bar 410. The bearing-supporting ring 470 is fitted around the support bar 410 in a manner such that it is brought into contact with an end of the compression spring 420. The adjusting ring 430 is arranged in a side-by-side relationship with the pressure plate 372 of the pressing member 370, so that support bars 410 of all pressure adjusting means 400 extend therethrough. The balancing weight 440 has one end which is placed between the compression spring 420, that is, the bearing-supporting ring 470 and the adjusting ring 430 and is formed with an internally threaded portion through which the support bar 410 is threadedly coupled to the balancing weight 440 to allow the balancing weight 440 to be capable of pivoting movement about the support bar 410. The elastic member 450 has one end which is secured to the other end of the balancing weight 440 and the other end which is secured to the clutch cover 310, so that the elastic member 450 can return the balancing weight 440 which is pivotally moved by the centrifugal force of the flywheel 40, to its original position. The pair of guide bearings 460 are fitted around the support bar 410 and located at both sides, respectively, of the one end of the balancing weight 440, to smooth the pivoting movement of the balancing weight 440. The support bars 410 which constitute the pressure adjusting means 400, are arranged in a manner such that they are spaced apart one from another in the circumferential direction by a predetermined angle.

The adjusting ring 430 has substantially an annular plate-shaped configuration and is defined, adjacent to a circumferential outer edge thereof, with support bar inserting holes 432 through each of which the support bar 410 is inserted. Each support bar inserting hole 432 has an inner diameter which is slightly larger than an outer diameter of the support bar 410, to enable the adjusting ring 430 to be easily moved in the one and the other directions. At both ends of each support bar inserting hole 432, there are defined a pair of circumferential ball seating grooves in which balls of the pair of guide bearings 460 are received.

Each balancing weight 440 has substantially a hexahedron-shaped configuration, and is arranged in the circumferential space which is defined between the clutch base 320 and the clutch cover 310 when the clutch base 320 and the clutch cover 310 are coupled to the flywheel 40. The balancing weight 440 is formed, at both ends thereof, with two semi-circular coupling portions 442 each of which is defined with a bore 442a. A circumferential ball seating groove is also defined around the bore 442a on a surface of the semi-circular coupling portion 442 which surface faces the support bar inserting hole 432, to allow the balls of the guide bearing 460 to be received therein.

The elastic member 450 comprises a torsion spring, and bushings are fitted around both ends of the elastic member 450, respectively. One end of the elastic member 450 is inserted through the bore 442a which is defined in one semi-circular coupling portion 442 of the balancing weight 440, and the other end of the elastic member 450 is secured to the inner surface of the clutch cover 310.

On the other hand, a first thrust bearing R1 is intervened between the bearing supporting boss 324 of the clutch base 320 and one end of the rotating member 350, a second thrust bearing R2 is intervened between the other end of the rotating member 350 and the inner surface of the clutch cover 310, and both end surfaces of the rotating member 350 and the inner surface of the clutch cover 310, on which the first and second thrust bearings R1 and R2 are seated, respectively, are formed with ball seating grooves to allow balls of the bearings R1 and R2 to be rollably received therein.

In FIGS. 8 through 10, the drawing reference numeral B1 represents a pilot bearing on which one end of the clutch bearing 50 is rotatably supported.

Hereinafter, operations of the car clutch according to the third embodiment of the present invention will be described in detail.

As shown in FIGS. 8 through 10, in a state wherein a motor vehicle initially runs after the engine starts, as the springs 374 of the pressing member 370 apply elastic force to the pressure plate 372, pressing force acts on the multiple disc clutch member 360, whereby the inner plates 362 and the outer plates 364 are tightly engaged one with another to cooperatively perform a braking function.

At this time, due to the fact that the outer plates 364 are splined to the cylindrical supporting boss 322 of the clutch base 320 and the inner plates 362 are splined to the rotating member 350, in a state wherein the inner plates 362 and the outer plates 364 are tightly engaged one with another, the rotating member 350 cannot be rotated.

Also, by the fact that the planetary gears 342 of the plurality of planetary gear sections 340 are meshed and secured to the internal ring gear 352 of the rotating member 350 and thereby cannot be rotated, the rotating force of the flywheel 40 is transferred to the sun gear 332 of the output shaft 330, which is meshed with the planetary gears 342, and then, is transferred to the clutch shaft 50 which is splined into the second spline grooves 334 of the output shaft 330.

Accordingly, the rotating force of the flywheel 40, which is generated by the engine, flows to the transmission through the clutch shaft 50 to maintain a running status of the motor vehicle.

On the other hand, in this state, if the driver depresses the clutch pedal to disconnect the engine power flow to the transmission and conduct the speed changing operation, by depressing force of the clutch pedal, the release bearing B10 is moved in the one direction toward the clutch base 320. The release bearing B10 presses the proximal ends of the release levers 120, and, by virtue of lever actions of the release levers 120, the distal ends of the release levers 120 pull the pull rods 380 in the other direction. Consequently, as the springs 374 are compressed, the pressure plate 372 is also moved in the other direction (that is, toward a right end in FIGS. 8 through 10). In other words, since the pressing force which is applied to the multiple disc clutch member 360 by the pressure plate 372, is removed, the outer plates 364 and the inner plates 362 are separated one from another.

Therefore, the rotating member 350 which is splined to the inner plates 362, can be freely rotated. When the clutch base 320 and the clutch cover 310 are integrally rotated with the flywheel 40, the planetary gears 342 of the plurality of planetary gear sections 340 are also rotated by the fact that their guide shafts 344 are rotatably supported at both ends thereof by the clutch base 320 and the clutch cover 310. By this, the planetary gears 342 are revolved around the sun gear 332 and at the same time are rotated about their own axes while idly rotating the rotating member 350 by their own rotating force.

That is to say, even though the rotating force of the flywheel 40 is transferred to the planetary gear sections 340 by the medium of the clutch cover 310, because the rotating member 350 which is operatively connected to the planetary gear sections 340, is maintained in a state wherein it can be independently and idly rotated, no load is transferred to the output shaft 330, whereby engine power flow to the clutch shaft 50 is disconnected.

In this situation, the driver can manipulate a shift lever to conduct the speed changing operation. After the speed changing operation is completed, if the driver releases the clutch pedal, the release bearing B10 is moved back in the other direction in which the release bearing B10 is separated from the clutch cover 310. At the same time, as pulling force which is applied by the release levers 120 to the pull rods 380, is removed, the multiple disc clutch member 360 is pressed again by the elastic force of the springs 374. The pull rods 380 are pushed back to their original positions by the springs 374, respectively. It is to be readily understood that the release levers 120 are also returned to their original positions.

In the meanwhile, as described above, as the inner plates 362 and the outer plates 364 of the multiple disc clutch member 360 are tightly engaged one with another by the pressing member 370 and the rotating force of the flywheel 40 is transferred to the clutch shaft 50, the pressure adjusting means 400 serve to maximize a power transfer efficiency, depending upon an engine RPM. Namely, as shown in FIGS. 9 and 10, in the case that the driver forcibly depresses an accelerator pedal, as an engine RPM increases, the flywheel 40 is rotated at a high rotational velocity. With this, as an RPM of the clutch base 320 and the clutch cover 310 which are rotated in an interlocked manner with the flywheel 40, increases, centrifugal force is generated by the balancing weights 440 which are arranged in the circumferential space which in turn is defined between the clutch base 320 and the clutch cover 310, whereby the balancing weights 440 are pivotally rotated in a direction which is shown by a solid arrow in FIG. 9. According to this, the compression springs 420 are further compressed and the balancing weights 440 are moved along the support bars 410 in a direction which is shown by a solid arrow in FIG. 10.

Therefore, because the adjusting ring 430 is freed from a state wherein it is maintained at a fixed location by elastic force of the compression springs 420, the pressure plate 372 which is limited in its pressing force by contact with the adjusting ring 430, presses the multiple disc clutch member 360 in a more powerful manner, whereby the rotating force of the flywheel 40 is transferred to the clutch shaft 50 through the clutch base 320 in a precise manner.

In other words, in the case that an engine RPM increases as in a high-speed running condition, power transfer of high precision and high efficiency can be accomplished.

On the other hand, if the driver decreases depressing force which is applied to the accelerator pedal, as an engine RPM decreases, the flywheel 40 is rotated at a low rotational velocity. Also, since an RPM of the clutch base 320 and the clutch cover 310 which are rotated in the interlocked manner with the flywheel 40, decreases, centrifugal force which is generated by the balancing weights 440 arranged in the circumferential space, is also reduced. According to this, the balancing weights 440 are returned to their original positions by the elastic force of the elastic members 450 in a direction which is shown by a dotted arrow in FIG. 9. The balancing weights 440 are returned to their original positions after being moved along the support bars 410, respectively, in a direction which is shown by a dotted arrow in FIG. 10.

That is to say, due to the fact that the balancing weights 440 are returned to their original positions, the adjusting ring 430 is also returned to its original position. And, pressing force which is applied to the multiple disc clutch member 360, is set to an initial value.

Accordingly, by the presence of the pressure adjusting means 400, power transfer is implemented in an adequate manner, depending upon an engine RPM, whereby high efficiency power transfer is possible.

Figure 11:
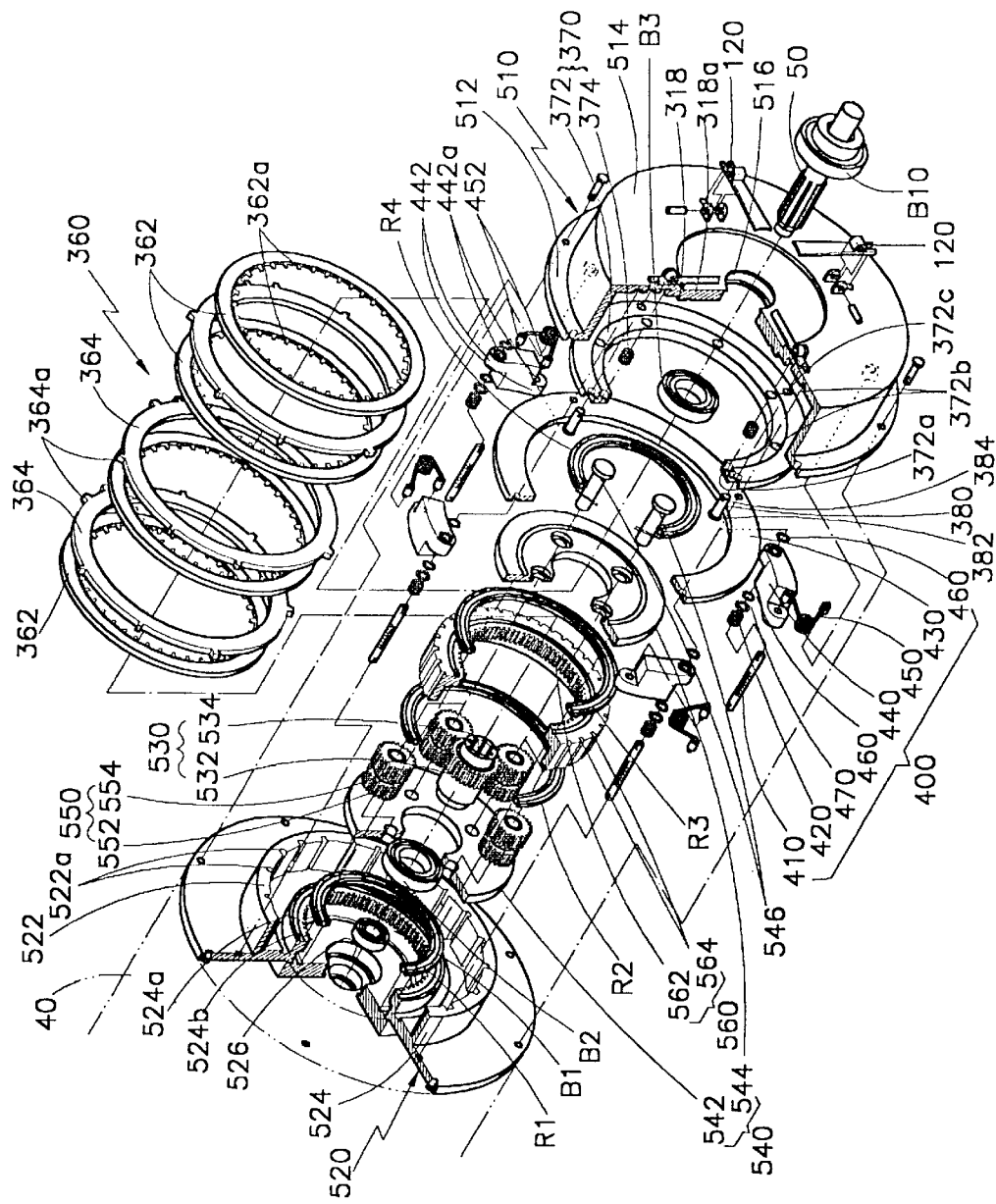
FIG. 11 is an exploded perspective view illustrating a car clutch in accordance with a fourth embodiment of the present invention.
Figure 12:
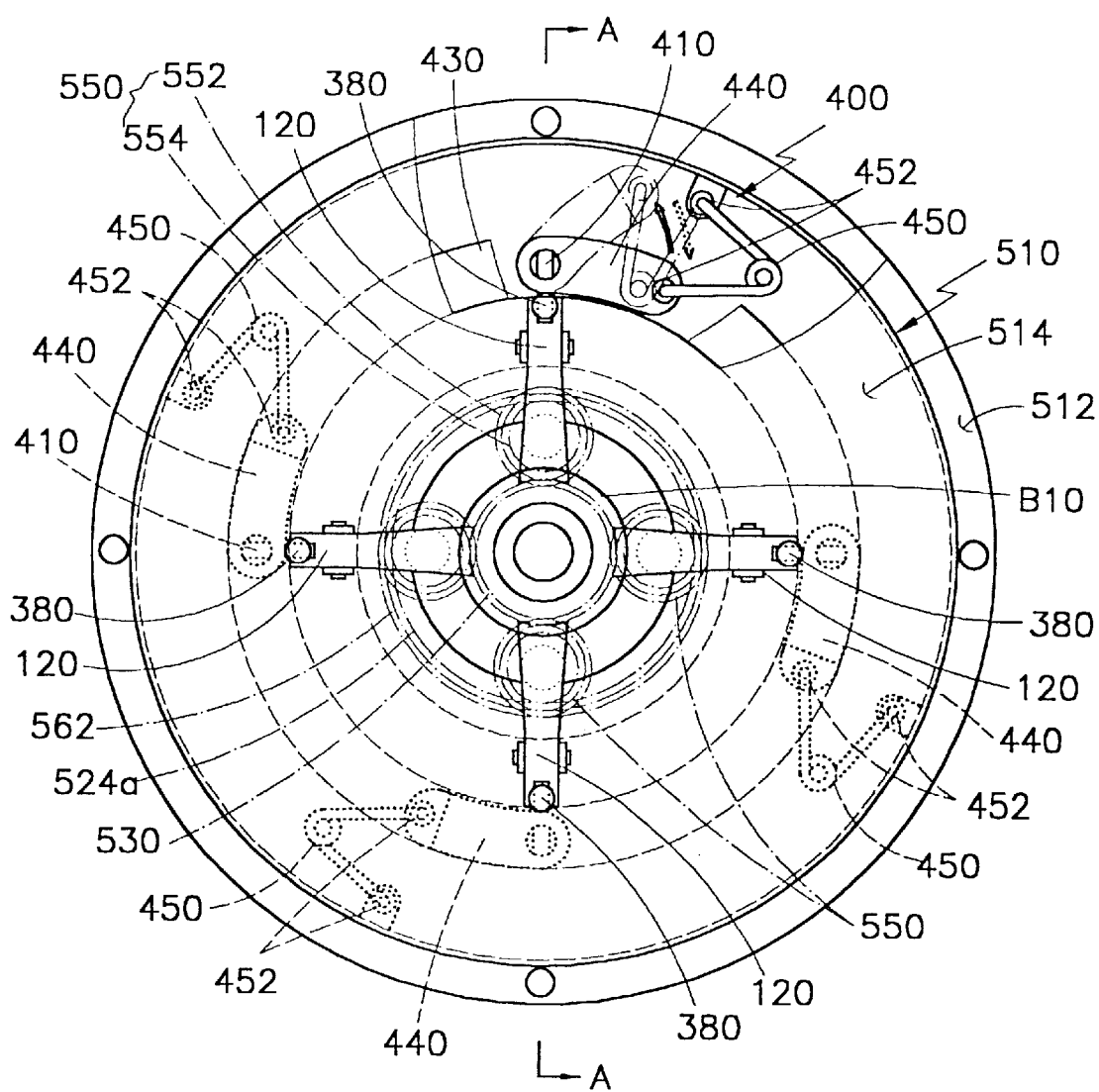
FIG. 12 is a partially broken-away schematic front view illustrating an operation of the car clutch in accordance with the fourth embodiment of the present invention.
Figure 13:
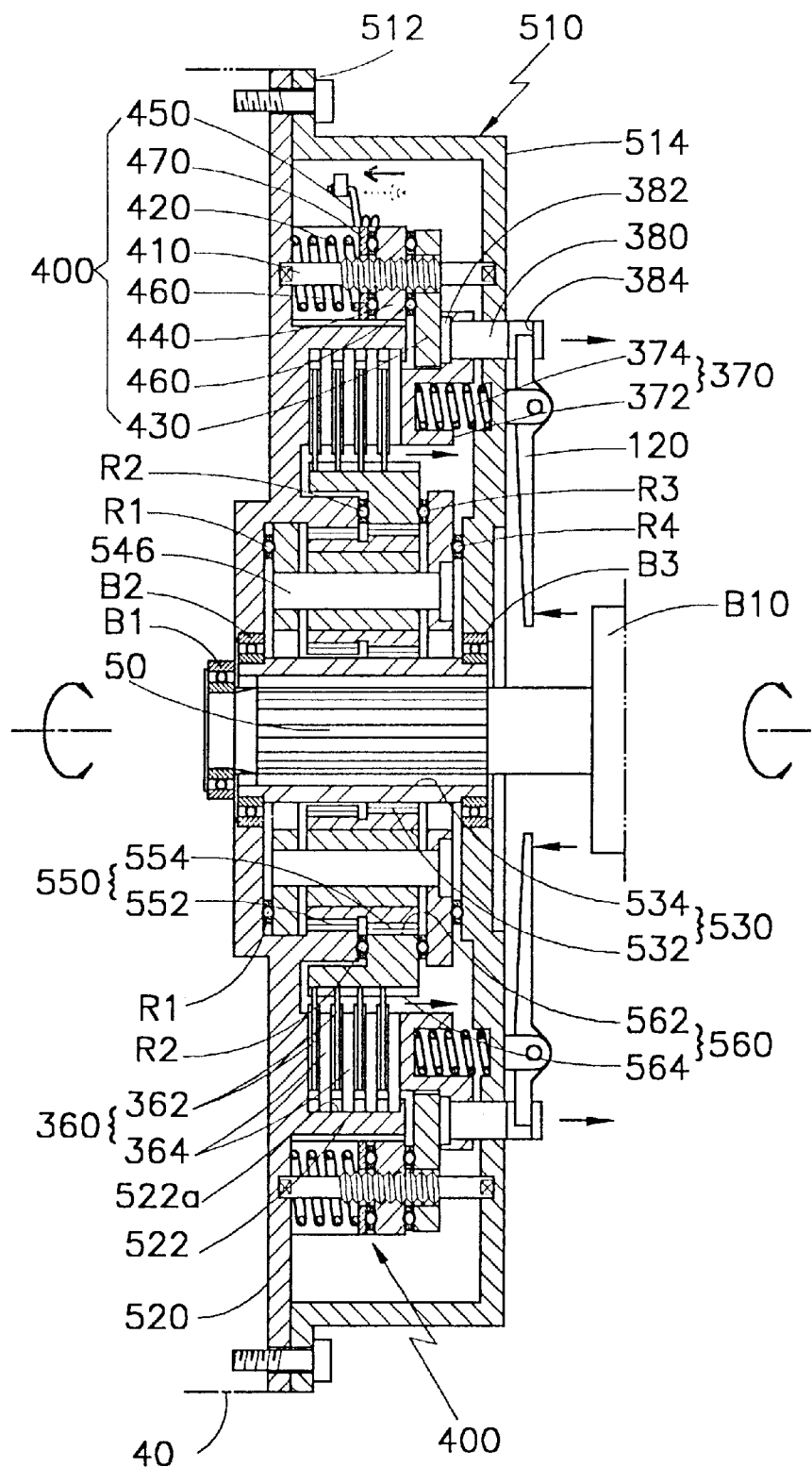
FIG. 13 is a cross-sectional view taken along the line A—A of FIG. 12, illustrating the car clutch in accordance with the fourth embodiment of the present invention.

FIG. 11 is an exploded perspective view illustrating a car clutch in accordance with a fourth embodiment of the present invention; FIG. 12 is a partially broken-away schematic front view illustrating an operation of the car clutch in accordance with the fourth embodiment of the present invention; and FIG. 13 is a cross-sectional view taken along the line A—A of FIG. 12, illustrating the car clutch in accordance with the fourth embodiment of the present invention. In this fourth embodiment of the present invention, the same drawing reference numerals will be used to designate the same parts as those in the third embodiment of the present invention.

As shown in FIGS. 11 through 13, a car clutch in accordance with a fourth embodiment of the present invention includes a clutch base 520 and a clutch cover 510 which are coupled to a rear surface of a flywheel 40 which is integrally rotated with a crankshaft of an engine, an output shaft 530 which is rotatably fitted through the clutch base 520 and the clutch cover 510, a carrier 540 which is located between an inner surface of the clutch base 520 and the clutch cover 510, a plurality of double planetary gear sections 550 which are operatively connected with the output shaft 530 inside the carrier 540, a rotating member 560 which is operatively connected with the plurality of double planetary gear sections 550, a multiple disc clutch member 360 which is fitted around the rotating member 560, a pressing member 370 which elastically biases the multiple disc clutch member 360 in one direction toward the clutch base 520, a plurality of pull rods 380 which pull the pressing member 370 in the other direction toward the clutch cover 510 to separate the pressing member 370 from the multiple disc clutch member 360, and pressure adjusting means 400 which is pivotally rotated by centrifugal force which is generated due to rotation of the flywheel 40, so as to adjust a pressure which is applied to the multiple disc clutch member 360. In the car clutch, power of the flywheel 40 is transmitted to a clutch shaft 50 through the output shaft 530. If a driver depresses a clutch pedal to conduct a speed changing operation, a release bearing B10 presses proximal ends of release levers 120. Thereafter, by virtue of lever actions of the release levers 120, the plurality of pull rods 380 are pulled toward the clutch cover 510, and power of the flywheel 40 is not transmitted to the clutch shaft 50.

The clutch cover 510 has substantially a cylindrical configuration which is opened at one end thereof and closed at the other end thereof. An outward flange portion 512 at which the clutch cover 510 is coupled to the flywheel 40, is formed on a circumferential outer surface of the clutch cover 510 at the one end which faces the flywheel 40. A center hole 516 through which the clutch shaft 50 is inserted, is defined through a center portion of a closed surface 514 of the clutch cover 510.

The clutch base 520 possesses a disc-shaped configuration. The clutch base 520 is interposed between the flywheel 40 and the clutch cover 510 and is coupled to the flywheel 40 along with the clutch cover 510. The clutch base 520 has a cylindrical supporting boss 522 which is projectedly formed on the inner surface of the clutch base 520. The cylindrical supporting boss 522 has first spline grooves 522a which are defined on a circumferential inner surface of the cylindrical supporting boss 522. The clutch base 520 further has a ring-shaped ring gear boss 524 which is projectedly formed on the inner surface of the clutch base 520 inward of the cylindrical supporting boss 522. A first internal ring gear 524a is formed on a circumferential inner surface of the ring gear boss 524. An output shaft inserting hole 526 through which one end of the output shaft 530 is inserted, is defined at a center portion of the clutch base 520 inside the ring gear boss 524. A ball seating groove 524b is defined on a free end surface of the ring gear boss 524.

The output shaft 530 possesses substantially a cylindrical configuration. One end of the output shaft 530 is inserted through the output shaft inserting hole 526 of the clutch base 520 to be supported by a bearing B2, and the other end of the output shaft 530 is rotatably fitted through the center hole 516 defined in the clutch cover 510 to be rotatably supported by a bearing B3. A sun gear 532 is formed on a circumferential outer surface of the output shaft 530, and second spline grooves 534 are defined on a circumferential inner surface of the output shaft 530.

The carrier 540 has a first disc 542 and a second disc 544 which are coupled with each other by means of a plurality of connecting members 546 in a manner such that the first disc 542 and the second disc 544 are spaced apart from each other by a predetermined distance. The first disc 542 is rotatably brought into contact at one surface thereof with the inner surface of the clutch base 520 by the medium of a first thrust bearing R1. The second disc 544 is rotatably brought into contact with the clutch cover 510 by the medium of a fourth thrust bearing R4. The plurality of connecting members 546 are arranged in a manner such that they are spaced apart one from another in a circumferential direction.

The plurality of double planetary gear sections 550 are fitted around the plurality of connecting members 546, respectively, in such a way as to be disposed in the carrier 540. Each double planetary gear section 550 has integrally formed thereon a first planetary gear 552 and a second planetary gear 554. The first planetary gear 552 is meshed with the first internal ring gear 524a, and the second planetary gear 554 is meshed with the sun gear 532 of the cylindrical output shaft 530.

The rotating member 560 possesses a ring-shaped configuration and has a second internal ring gear 562 and third spline grooves 564. The second internal ring gear 562 is formed on a circumferential inner surface of the rotating member 560 and is meshed with second planetary gears 554 of the plurality of double planetary gear sections 550. The third spline grooves 564 are defined on a circumferential outer surface of the rotating member 560.

The multiple disc clutch member 360 has a plurality of inner plates 362 which are fitted around the rotating member 560 and a plurality of outer plates 364 which are fitted into the cylindrical supporting boss 522 of the clutch base 520 and each of which is intervened between two adjoining inner plates 362. Each inner plate 362 has spline teeth 362a which are formed on a circumferential inner surface thereof and are splined into the third spline grooves 564 of the rotating member 560. Each outer plate 364 has spline teeth 364a which are formed on a circumferential outer surface thereof and are splined into the first spline grooves 522a of the cylindrical supporting boss 522.

The pressing member 370 is disposed between the multiple disc clutch member 360 and the clutch cover 510 for elastically biasing the multiple disc clutch member 360 in the one direction toward the clutch base 520 in a manner such that the inner plates 362 and the outer plates 364 are brought into tight contact one with another and thereby are locked one to another. The pressing member 370 includes a pressure plate 372 and a plurality of springs 374. The pressure plate 372 possesses substantially an annular plate-shaped configuration. The pressure plate 372 has a pressing part 372a which is bent from a plane of the pressure plate 372 to be brought into contact with the multiple disc clutch member 360. The pressing part 372a defines a plurality of spring receiving grooves 372b on a surface thereof which is opposed to the multiple disc clutch member 360. The pressure plate 372 is formed with a plurality of pull rod inserting holes 372c through which the plurality of pull rods 380 are inserted, respectively. The plurality of springs 374 are inserted into the plurality of spring receiving grooves 372b, respectively.

The plurality of pull rods 380 are inserted through the clutch cover 510. The plurality of pull rods 380 have one ends which are coupled to distal ends of the release levers 120 and the other ends which are fastened to the pressure plate 372 of the pressing member 370. When external force is applied to the proximal ends of the release levers 120, the pull rods 380 are moved in the other direction (that is, toward a right end in FIGS. 11 through 13), thereby to separate the pressure plate 372 of the pressing member 370 from the multiple disc clutch member 360. In its detail configuration, each pull rod 380 has one end which is formed as a head portion 382 and the other end which is formed with an engaging projection 384.

The pressure adjusting means 400 are structured in the same way as those of the third embodiment of the present invention.

Meanwhile, a second thrust bearing R2 is intervened between the ring gear boss 524 of the clutch base 520 and one end of the rotating member 560, and a third thrust bearing R3 is intervened between the other end of the rotating member 560 and the second disc 544 of the carrier 540, to enable the rotating member 560 to be smoothly rotated.

In the car clutch according to this embodiment of the present invention, constructed as mentioned above, the first and second planetary gears 552 and 554 have different numbers of teeth or different modules, to allow a predetermined reduction gear ratio to be obtained.

Hereinafter, operations of the car clutch according to the fourth embodiment of the present invention will be described in detail.

As shown in FIGS. 11 through 13, in a state wherein a motor vehicle initially runs after the engine starts, as the springs 374 of the pressing member 370 apply elastic force to the pressure plate 372, pressing force acts on the multiple disc clutch member 360, whereby the inner plates 362 and the outer plates 364 are tightly engaged one with another to cooperatively perform a braking function.

At this time, due to the fact that the outer plates 364 are splined to the cylindrical supporting boss 522 of the clutch base 520 and the inner plates 362 are splined to the rotating member 560, in a state wherein the inner plates 362 and the outer plates 364 are tightly engaged one with another, the rotating member 560 cannot be rotated.

Rotating force of the flywheel 40 is transferred to the first planetary gears 552 of the plurality of double planetary gear sections 550, which are meshed with the first internal ring gear 524a which is formed on the circumferential inner surface of the ring gear boss 524 of the clutch base 520, and then, to the second planetary gears 554 which are integrally formed with the first planetary gears 552. However, as described above, because the rotating member 560 is captured by the multiple disc clutch member 360 and thereby cannot be rotated, the rotating force of the flywheel 40 is transferred to the sun gear 532 of the output shaft 530, which is meshed with the second planetary gears 554, to rotate the output shaft 530, and then, is transferred to the clutch shaft 50 which is splined to the second spline grooves 534 which are formed on the circumferential inner surface of the output shaft 530.

Accordingly, the rotating force of the flywheel 40, which is generated by the engine, flows to the transmission through the clutch shaft 50 to maintain a running status of the motor vehicle.

In the procedure of transferring engine power, wherein the rotating force of the flywheel 40 is transferred in order of the first planetary gears 552, the second planetary gears 554 and the sun gear 532, due to the fact that the predetermined reduction gear ratio is obtained by the first and second planetary gears 552 and 554, reduction in rotational velocity is achieved through the first and second planetary gears 552 and 554. As a consequence, since rotating force which is applied to the rotating member 560, is lessened, when the multiple disc clutch member 360 performs the braking function with the aid of the pressing member 370, small frictional force is induced, whereby the braking function can be reliably implemented with small pressing force. By this, components of the car clutch are prevented from being worn out or damaged, thereby to improve durability of the entire car clutch.

On the other hand, in this state, if the driver depresses the clutch pedal to disconnect the engine power flow to the transmission and conduct the speed changing operation, by depressing force of the clutch pedal, the release bearing B10 is moved in the one direction toward the clutch base 520. The release bearing B10 presses the proximal ends of the release levers 120, and, by virtue of lever actions of the release levers 120, the distal ends of the release levers 120 pull the pull rods 380 in the other direction (that is, toward a right end in FIGS. 11 through 13). Consequently, as the springs 374 are compressed, the pressure plate 372 is also moved in the other direction. In other words, since the pressing force which is applied to the multiple disc clutch member 360 by the pressure plate 372, is removed, the outer plates 364 and the inner plates 362 are separated one from another.

Therefore, the rotating member 560 which is splined to the inner plates 362, can be freely rotated. When the clutch base 520 and the clutch cover 510 are integrally rotated with the flywheel 40, the first and second planetary gears 552 and 554 of the plurality of double planetary gear sections 550 are also rotated in an interlocked manner. By this, the second planetary gears 554 are revolved around the sun gear 532 and at the same time are rotated about their own axes while idly rotating the rotating-member 560 by their own rotating force.

That is to say, even though the rotating force of the flywheel 40 is transferred to the plurality of double planetary gear sections 550 by the medium of the clutch cover 510, because the rotating member 560 which is operatively connected to the plurality of double planetary gear sections 550, is maintained in a state wherein it can be independently and idly rotated, no load is transferred to the output shaft 530, whereby engine power flow to the clutch shaft 50 is disconnected.

In this situation, the driver can manipulate a shift lever to conduct the speed changing operation. After the speed changing operation is completed, if the driver releases the clutch pedal, the release bearing B10 is moved back in the other direction in which the release bearing B10 is separated from the clutch cover 510. At the same time, as pulling force which is applied by the release levers 120 to the pull rods 380, is removed, the multiple disc clutch member 360 is pressed again by the elastic force of the springs 374. The pull rods 380 are pushed back to their original positions by the springs 374, respectively. It is to be readily understood that the release levers 120 are also returned to their original positions.

In the meanwhile, as the inner plates 362 and the outer plates 364 of the multiple disc clutch member 360 are tightly engaged one with another by the pressing member 370 and the rotating force of the flywheel 40 is transferred to the clutch shaft 50, the pressure adjusting means 400 serve to maximize a power transfer efficiency, depending upon an engine RPM, which is the same as described in connection with the third embodiment of the present invention.

Figure 14:
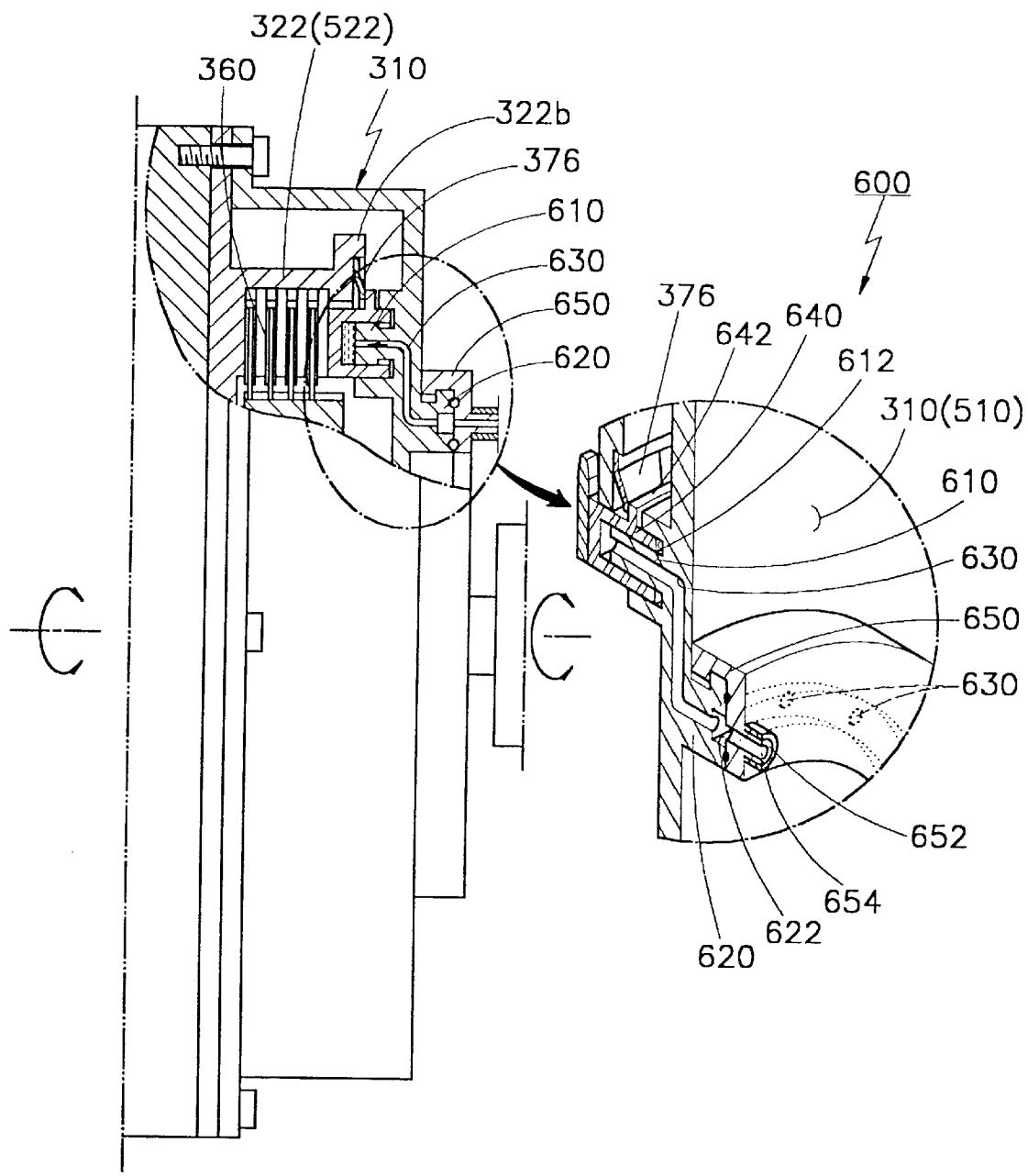
FIG. 14 is a partially broken-away and partially perspectively enlarged side view illustrating a car clutch in accordance with a fifth embodiment of the present invention.

FIG. 14 is a partially broken-away and partially perspectively enlarged side view illustrating a car clutch in accordance with a fifth embodiment of the present invention. The car clutch in accordance with this fifth embodiment of the 3present invention can be constructed in the same way as that of the third embodiment or fourth embodiment, except that the pressing member 370 for pressing the multiple disc clutch member 360 is replaced with a hydraulic device 600 which is actuated through manipulation of a switch button by a driver, to bias the multiple disc clutch member 360 in the one direction toward the clutch base 320 or 520, and an annular leaf spring 376 is installed on the cylindrical supporting boss 322 or 522 of the clutch base 320 or 520, to exert elastic pressing force on the hydraulic device 600 thereby to remove external force which is applied to the multiple disc clutch member 360. In the car clutch according to this embodiment of the present invention, without pressing the release levers 120 by virtue of depressing the clutch pedal, the clutch can be reliably operated, and thereby the clutch pedal and release levers 120 can be eliminated. Further, since pressing force which is applied to the multiple disc clutch member 360, can be adjusted by the hydraulic device 600, the pressure adjusting means 400 are not needed.

The hydraulic device 600 includes a piston guide part 610, an oil inlet part 620, an oil supplying line 630, a piston 640, and a line connecting member 650. The piston guide part 610 is projectedly formed on the inner surface of the clutch cover 310 or 510 which inner surface faces the multiple disc clutch member 360, and has a pair of piston guide grooves 612. The oil inlet part 620 is projectedly formed on an outer surface of the clutch cover 310 or 510 to define a ring-shaped configuration, and has an oil groove 622 which is defined on an outer surface of the oil inlet part 620. The oil supplying line 630 is formed in a manner such that it extends between the oil groove 622 of the oil inlet part 620 and a distal end of the piston rod guide part 610. The piston 640 is brought into tight contact with the multiple disc clutch member 360 by a pressure of oil which is supplied through the oil supplying line 630. The piston 640 has a body which takes a clockwise 90° rotated U-shaped cross-section and a spring supporting projection 642 against which one end of the annular leaf spring 376 is supported. The line connecting member 650 is coupled to the oil inlet part 620 and is fixedly maintained in a manner such that the clutch cover 310 or 510 can be freely rotated with respect to the line connecting member 650. The line connecting member 650 has a connector 652 which is formed with an oil hole 654 which in turn is communicated with the oil groove 622 of the oil inlet part 620.

A circumferential inner surface of the piston 640 and opposite surfaces of the line connecting member 650 and the oil inlet part 620 which are brought into sliding contact with each other, are defined with circumferential grooves into which leakage preventing members such as 0-rings are fitted for preventing oil from leaking.

While not shown in the drawings, the hydraulic device 600 is provided with additional parts including a pipeline which is connected with the connector 652, a control valve which controls a flow direction and a pressure of oil supplied through the pipeline, an oil pump which supplies compressed oil, and so on. The additional parts can be modified into a variety of forms within the scope of the present invention.

A circumferential outer end of the cylindrical supporting boss 322 or 522 is formed with a spring supporting sleeve 322b against which the other end of the annular leaf spring 376 is fastened.

Hereinafter, operations of the car clutch according to the fifth embodiment of the present invention will be described in detail.

In a state wherein a motor vehicle initially runs after the engine starts, oil is supplied through the oil supplying line 630 to bias the piston 640 in the one direction toward the clutch base 320 or 520, and external force is applied to the multiple disc clutch member 360, whereby the inner plates 362 and the outer plates 364 are tightly engaged one with another. By this, through the same operations as described in association with the third embodiment or the fourth embodiment of the present invention, the rotating force of the flywheel 40 is transferred to the clutch shaft 50 to maintain a running status of the motor vehicle.

On the other hand, if a driver depresses the switch button (not shown), the annular leaf spring 376 forces the spring supporting projection 642 to move in the other direction toward the clutch cover 310 or 510. Due to this, as the oil which is compressively supplied into the piston 640, is drained, the piston 640 is moved in the other direction toward the clutch cover 310 or 510. Therefore, in this situation, the driver can manipulate a shift lever to conduct the speed changing operation. After the speed changing operation is completed, if the driver releases the switch button, the piston 640 is moved back to its original position to allow the rotating force of the flywheel 40 to be transferred again to the transmission.

Figure 15:
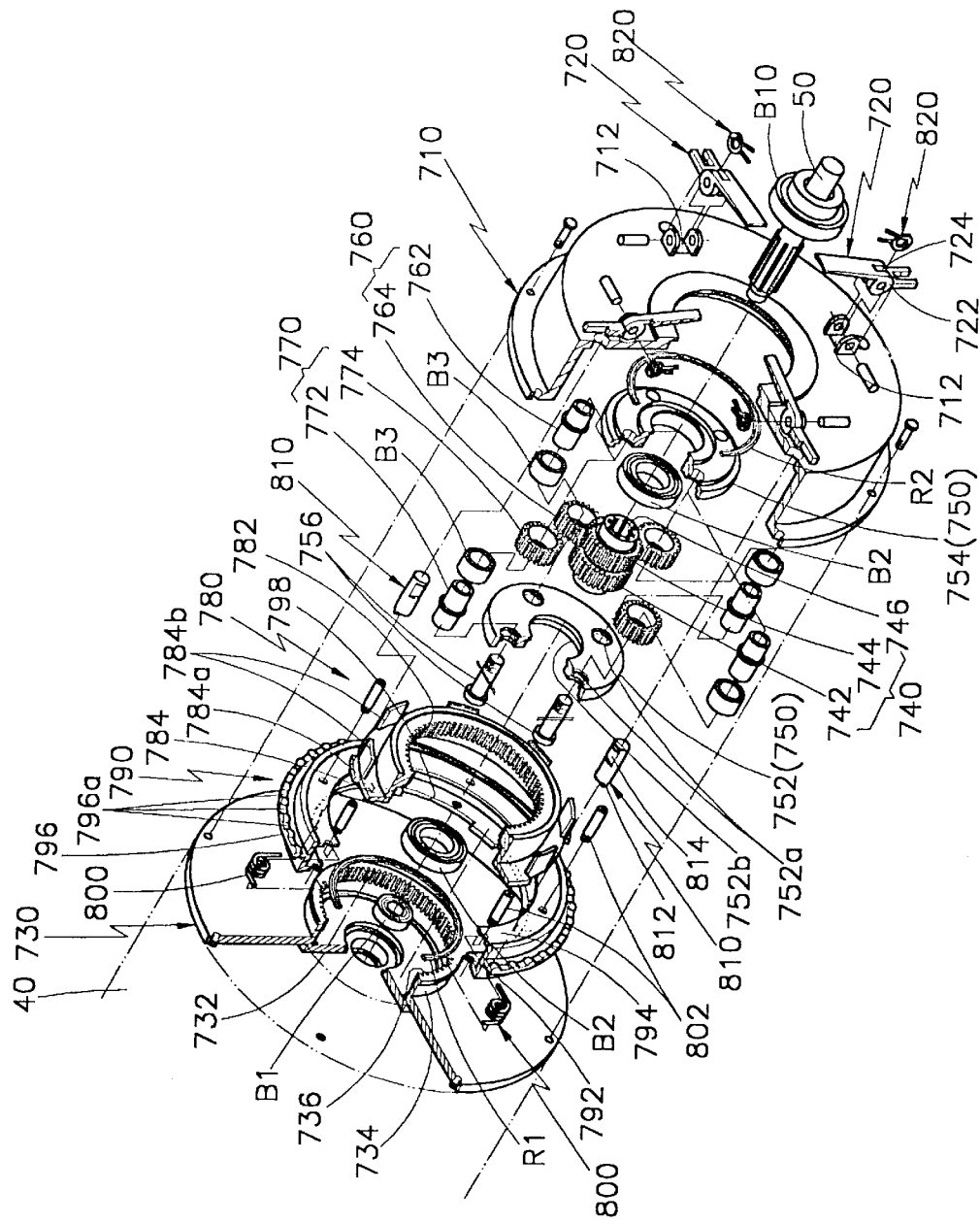
FIG. 15 is an exploded perspective view illustrating a car clutch in accordance with a sixth embodiment of the present invention.
Figure 16:
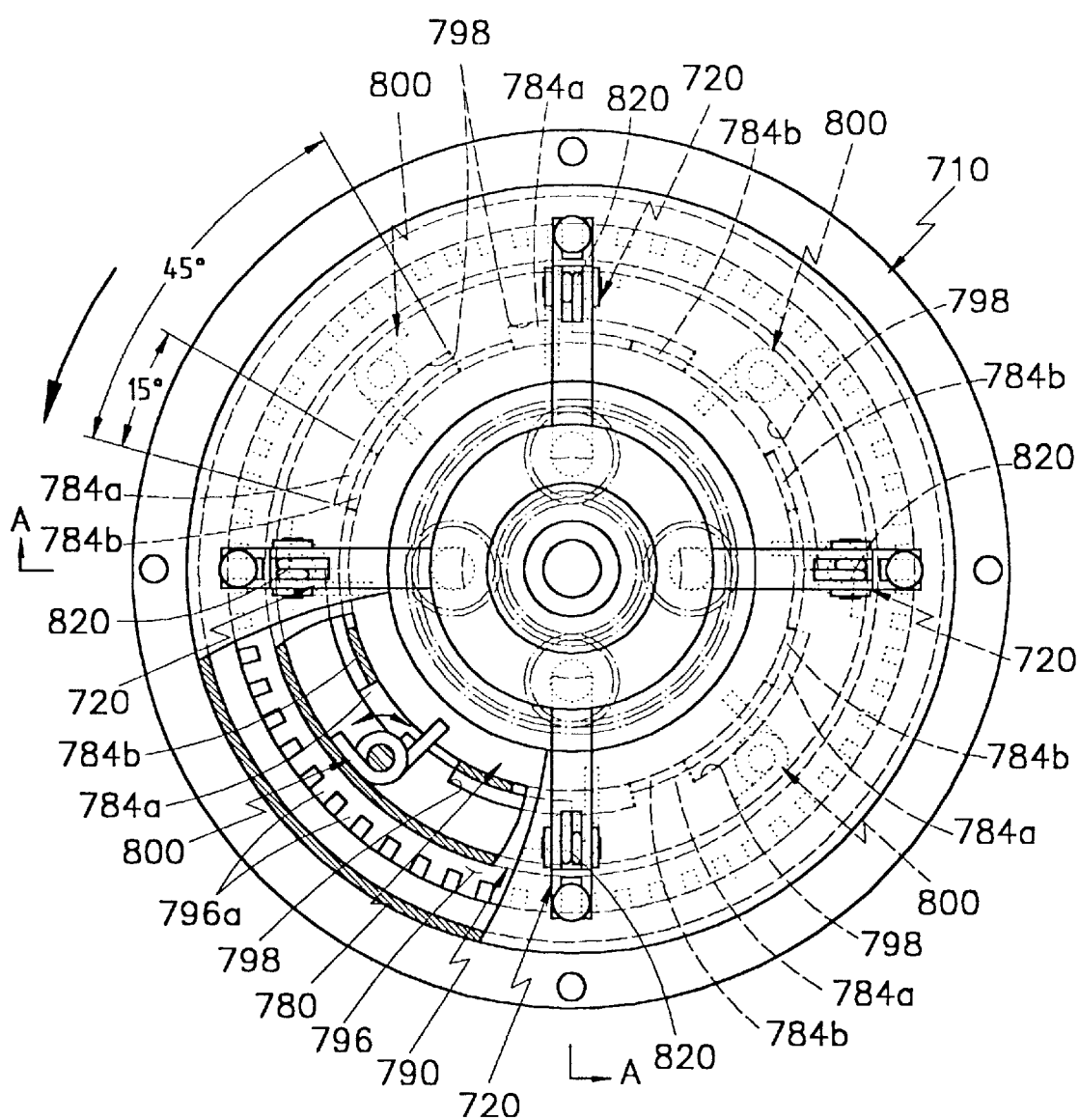
FIG. 16 is a partially broken-away schematic front view illustrating an operation of the car clutch in accordance with the sixth embodiment of the present invention.

FIG. 15 is an exploded perspective view illustrating a car clutch in accordance with a sixth embodiment of the present invention; FIG. 16 is a partially broken-away schematic front view illustrating an operation of the car clutch in accordance with the sixth embodiment of the present invention; and FIG. 17 is a cross-sectional view taken along the line A—A of FIG. 16, illustrating the car clutch in accordance with the sixth embodiment of the present invention.

Figure 17:
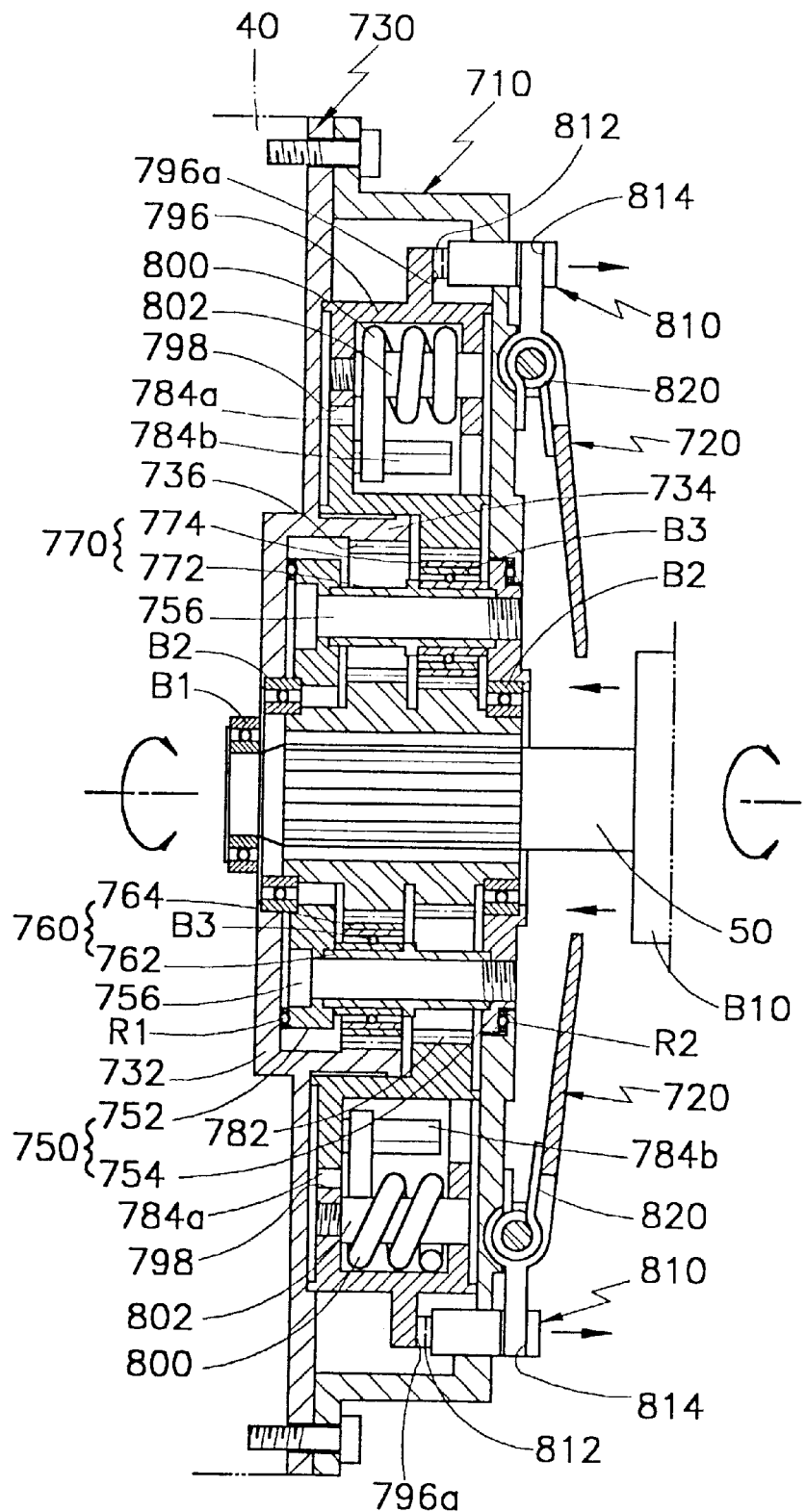
FIG. 17 is a cross-sectional view taken along the line A—A of FIG. 16, illustrating the car clutch in accordance with the sixth embodiment of the present invention.

As shown in FIGS. 15 through 17, a car clutch in accordance with a sixth embodiment of the present invention includes a clutch cover 710 mounted to a rear surface of a flywheel 40 which is integrally rotated with a crankshaft of an engine, and a clutch mechanism disposed in a space which is defined between the clutch cover 710 and the flywheel 40. In the car clutch according to the sixth embodiment of the present invention, power of the flywheel 40 is transmitted to a clutch shaft 50 by means of the clutch mechanism, and, when a driver depresses a clutch pedal, a release bearing B10 presses proximal ends of release levers 720 and, by virtue of lever actions of the release levers 720, power of the flywheel 40 is not transmitted to the clutch shaft 50.

The clutch mechanism includes a disc-shaped clutch base 730, a cylindrical output shaft 740, and a carrier 750. The disc-shaped clutch base 730 is interposed between the flywheel 40 and the clutch cover 710, and is coupled to the flywheel 40 along with the clutch cover 710. The clutch base 730 is formed, at a center portion thereof, with a seating part 732 which projects in one direction toward the flywheel 40 and a cylindrical ring gear boss 734 which projects in the other direction toward the clutch cover 710. The cylindrical ring gear boss 734 has an input-side internal ring gear 736 which is formed on a circumferential inner surface of the cylindrical ring gear boss 734. The cylindrical output shaft 740 is rotatably fitted at one end thereof through a center portion of the seating part 732 of the clutch base 730 and at the other end thereof through the clutch cover 710. The cylindrical output shaft 740 has a first sun gear 742 and a second sun gear 744 which are integrally formed on a circumferential outer surface of the cylindrical output shaft 740. The cylindrical output shaft 740 further has spline grooves 746 which are defined on a circumferential inner surface of the cylindrical output shaft 740. The carrier 750 has a first carrier member 752 and a second carrier member 754. The fist carrier member 752 is rotatably brought into contact with an inner surface of the clutch base 730 by the medium of a first thrust bearing R1. The first carrier member 752 has a plurality of shaft inserting holes 752a which are spaced apart one from another by a predetermined angle along a circumferential direction and an output shaft inserting hole 752b which is defined at a center portion of the first carrier member 752 to allow the one end of the cylindrical output shaft 740 to be inserted therethrough. The second carrier member 754 is rotatably brought into contact with the clutch cover 710 by the medium of a second thrust bearing R2. The second carrier member 754 has a plurality of shaft inserting holes which are spaced apart one from another by the predetermined angle along the circumferential direction and an output shaft inserting hole which is defined at a center portion of the second carrier member 754 to allow the other end of the cylindrical output shaft 740 to be inserted therethrough.

The clutch mechanism further includes a pair of first planetary gear sections 760, a pair of second planetary gear sections 770, a first rotating member 780, and a second rotating member 790. The pair of first planetary gear sections 760 are oppositely arranged to each other. Each first planetary gear section 760 possesses a first guide shaft 762 and a first planetary gear 764. The first guide shaft 762 is installed between the first and second carrier members 752 and 754. The first planetary gear 764 is fitted around the first guide shaft 762 and is meshed with the first sun gear 742 and the input-side internal ring gear 736. The pair of second planetary gear sections 770 are oppositely arranged to each other. Each second planetary gear section 770 possesses a second guide shaft 772 and a second planetary gear 774. The second guide shaft 772 is installed between the first and second carrier members 752 and 754. The second planetary gear 774 is fitted around the second guide shaft 772 and is meshed with the second sun gear 744. The first rotating member 780 possesses a cylindrical configuration. The first rotating member 780 has an output-side internal ring gear 782 which is formed on a circumferential inner surface of the first rotating member 780 and is meshed with second planetary gears 774 of the pair of second planetary gear sections 770. The first rotating member 780 further has an auxiliary ring part 784 which is integrally formed at an end of the first rotating member 780 in such a way as to extend in a radial direction and is rotatably brought into contact with the clutch base 730. The auxiliary ring part 784 has a plurality of engaging projections 784a which are projectedly formed on a circumferential outer edge of the auxiliary ring part 784 in such a way as to be spaced apart one from another along the circumferential direction. The auxiliary ring part 784 further has a plurality of spring engaging pieces 784b which are integrally secured to a surface of the auxiliary ring part 784 adjacent to the circumferential outer edge of the auxiliary ring part 784 in such a way as to be spaced apart one from another along the circumferential direction and extend in an axial direction. The second rotating member 790 is rotatably supported between the clutch base 730 and the clutch cover 710. The second rotating member 790 is formed with two outward flange parts 792 and 794 which are bent at an angle of 90° at both ends of the second rotating member 790 to extend in the radial and circumferential directions to define a U-shaped cross-section. The second rotating member 790 has a connecting part 796 which is projectedly formed on a circumferential outer surface of the second rotating member 790. The connecting part 796 has a plurality of fitting grooves 796a which are defined on a surface of the connecting part 796 in a manner such that they are spaced apart one from another by a preset angle along the circumferential direction. One outward flange part 792 has a plurality of engaging grooves 798 which are defined on a circumferential inner edge of the one outward flange part 792 in a manner such that the plurality of engaging projections 784a of the first rotating member 780 can be engaged into the plurality of engaging grooves 798, respectively, in such a way as to be capable of being rotated therein within the range of an angle.

The clutch mechanism still further includes a plurality of clutch springs 800, a plurality of power shutoff rods 810, and a plurality of lever-squeezing elastic members 820. The plurality of clutch springs 800 are wound around a plurality of fixing pins 802, respectively, which are fastened to the two outward flange parts 792 and 794 of the second rotating member 790, in a manner such that the clutch springs 800 are spaced apart one from another by a preselected angle along the circumferential direction. Each clutch spring 800 has one end which is inserted into a space defined between two adjoining spring engaging pieces 784b and the other end which is supported by a circumferential inner surface of the second rotating member 790. The plurality of power shutoff rods 810 are installed through the clutch cover 710 in such a way as to be spaced apart one from another along the circumferential direction so that they can be moved into or out of the clutch cover 710 upon applying or removing external force to or from the release levers 720. Each power shutoff rod 810 is formed, at one end thereof, with a fitting projection 812 which is fitted into one of the plurality of fitting grooves 796*a* of the connecting part 796 of the second rotating member 790 and, adjacent to the other end thereof, with a flatted portion 814 which is grasped by each release lever 720. Each of the plurality of lever-squeezing elastic members 820 is installed between each release lever 720 and the clutch cover 710 in a manner such that external force can be applied to the release lever 720 to fit the fitting projection 812 of the power shutoff rod 810 into one of the plurality of fitting grooves 796*a* of the connecting part 796 of the second rotating member 790.

In the car clutch according to this embodiment of the present invention, constructed as mentioned above, each engaging projection 784*a* of the first rotating member 780 extends through an angle of about 15° along the circumferential direction, and each engaging groove 798 in which the engaging projection 784*a* is engaged, is defined through an angle of about 45° along the circumferential direction, which serves as safety means for preventing the first and second rotating members 780 and 790 from being uncoupled from each other due to an overload, a mis-operation or the like.

Each lever-squeezing elastic member 820 comprises a torsion spring which is wound around a hinge shaft for each release lever 720. The torsion spring 820 has one end which is supported by a surface of the release lever 720 and the other end which is supported against an outer surface of the clutch cover 710. A hinged portion 722 of the release lever 720 is formed with a slit 724 for allowing the one end of the torsion spring 820 to be stably seated onto the release lever 720.

Further, the first and second guide shafts 762 and 772 of the first and second planetary gear sections 760 and 770 are mounted to the carrier 750 by means of a plurality of fixing bolts 756. A plurality of bearings B3 are fitted around the circumferential outer surfaces of the first and second guide shafts 762 and 772 to support rotation of the first and second planetary gears 764 and 774, respectively.

A pair of hinge supporting pieces 712 between which the hinged portion 722 of the release lever 720 is sandwiched, are fastened to the outer surface of the clutch cover 710 to allow the hinge shaft for each release lever 720 to be inserted therethrough.

A bearing can be disposed between the inner surface of the clutch base 730 and the auxiliary ring part 784 of the first rotating member 780 which are brought into sliding contact with each other, to support rotation of the first rotating member 780. Also, a bearing can be disposed between the inner surface of the clutch base 730 and the one outward flange part 792 of the second rotating member 790 which are brought into sliding contact with each other, to support rotation of the second rotating member 790. The drawing reference numeral B1 represents a pilot bearing, and B2 a bearing for rotatably supporting the cylindrical output shaft 740.

Hereinafter, operations of the car clutch according to the sixth embodiment of the present invention will be described in detail.

As shown in FIGS. 16 and 17, when a motor vehicle runs in a state wherein the driver does not depress the clutch pedal, distal ends of the release levers 720 are biased in the one direction toward the clutch base 730 by elastic force of the lever-squeezing elastic members 820, and thereby, the power shutoff rods 810 which are grasped at their flatted portions 814 by the release levers 720, are also biased in the one direction toward the clutch base 730, whereby the fitting projections 812 of the power shutoff rods 810 are fitted into the fitting grooves 796*a* of the connecting part 796 of the second rotating member 790. Thereupon, the second rotating member 790 is integrally coupled with the clutch cover 710 and thereby, cannot be independently rotated. At the same time, because the first rotating member 780 is secured to the second rotating member 790 by the medium of the clutch springs 800 which are arranged in the second rotating member 790, the first rotating member 780 is also integrally coupled with the clutch cover 710 and thereby, cannot also be independently rotated.

In this state, the first planetary gears 764 which are meshed with the input-side internal ring gear 736, receive the rotating force of the flywheel 40 through the clutch base 730, so as to rotate the carrier 750. However, since the second planetary gears 774 of the second planetary gear sections 770 are meshed with the output-side internal ring gear 782 of the first rotating member 780, the carrier 750 having disposed therein the first and second planetary gear sections 760 and 770 cannot be independently rotated. According to this, the output shaft 740 which is meshed with the first and second planetary gears 764 and 774 through the first and second sun gears 742 and 744, is integrally clamped to the clutch base 730 and the clutch cover 710.

In other words, the output shaft 740 is integrally rotated with the clutch base 730 and the clutch cover 710 which are rotated by the rotating force of the flywheel 40. In conformity with this, the clutch shaft 50 which is splined to the output shaft 740, is rotated to transfer the engine power to the transmission.

In the above-stated operations, when explaining in more detail a procedure wherein the second rotating member 790 which is integrally coupled with the clutch cover 710 and the first rotating member 780, are rigidly secured to each other, if the second rotating member 790 which is affixed to the clutch cover 710, is rotated, as can be readily seen from FIG. 16, the one end of each clutch spring 800, which is inserted into the space defined between two adjoining spring engaging pieces 784*b*, is engaged by one spring engaging pieces 784*b* after being rotated by an angle. In this situation, as the second rotating member 790 is continuously rotated, the one end of the clutch spring 800 is gradually and elastically deformed in a direction which is shown by an arrow in FIG. 16. When the one end of the clutch spring 800 reaches a position where it cannot be deformed any more, the first and second rotating members 780 and 790 are rigidly secured to each other. Namely, when an engine RPM is within a predetermined range, a semi-clutching operation under which the first and second rotating members 780 and 790 are not securely fixed to each other, can be implemented as in the conventional friction clutch.

That is to say, even though the driver abruptly releases the clutch pedal after once depressing the clutch pedal, since power is gradually transferred to the clutch shaft 50 until each clutch spring 800 reaches a position where it is maximally deformed, it is possible to prevent the engine from stopping or the motor vehicle from sliding on a slope way, which can be otherwise caused when the rotating force of the flywheel 40 is quickly transferred to the clutch shaft 50.

On the contrary, if the driver depresses the clutch pedal to conduct speed changing operation, the release bearing B10 is moved toward the clutch cover 710 to press the proximal ends of the release levers 720. Because the power shutoff rods 810 are pulled by virtue of the lever actions of the release levers 720, one ends of the power shutoff rods 810 are moved out of the fitting grooves 796*a* of the connecting part 796 of the second rotating member 790. Hence, the rotating member 790 can be independently rotated, and the first rotating member 780 which is coupled to the second rotating member 790 through the clutch springs 800, can also be independently rotated integrally with the second rotating member 790.

In this condition, the first planetary gears 764 which are meshed with the input-side internal ring gear 736, receive the rotating force of the flywheel 40 through the clutch base 730 to rotate the carrier 750. At this time, because the second planetary gears 774 of the second planetary gear sections 770 which are disposed inside the carrier 750, are meshed with the output-side internal ring gear 782 of the first rotating member 780 which can be freely rotated, the carrier 750 having disposed therein the first and second planetary gear sections 760 and 770 can be freely rotated. Consequently, the first and second planetary gears 764 and 774 cannot drive the output shaft 740 and instead, are revolved around the output shaft 740.

In other words, since driving force is not transferred to the output shaft 740, the clutch shaft 50 which is splined to the output shaft 740, is maintained in a non-loaded state wherein the driver can freely manipulate the shift lever to conduct speed changing operation.

INDUSTRIAL APPLICABILITY

As a result, the car clutch according to the present invention provides advantages in that, since clutch operations for connecting and disconnecting engine power flow to a transmission can be implemented in a simple and reliable manner, it is possible to prevent components of the car clutch from being worn out or being damaged, whereby durability is improved and a maintenance fee is reduced. Particularly, due to the fact that a power transferring efficiency is increased, a fuel efficiency is also remarkably increased.

Persons skilled in the art will readily recognize that application of the constructions according to the first through sixth embodiments of the present invention is not limited only to car clutches but instead, can be extended to power transferring systems such as general industrial machines requiring a power connecting and disconnecting function, by which improvements can be achieved in terms of applicability, durability and a power transferring efficiency of a clutch.

What is claimed is:

1. A car clutch wherein a clutch cover is mounted to a free end surface of a flywheel which is integrally rotated with a crankshaft of an engine, power of the flywheel is transmitted to a clutch shaft by means of a clutch mechanism which is disposed inside the clutch cover, and, when a clutch pedal is depressed, a release bearing presses proximal ends of release levers and, by virtue of lever actions of the release levers, power of the flywheel is not transmitted to the clutch shaft, the clutch mechanism comprising:

a disc-shaped clutch base interposed between the flywheel and the clutch cover, coupled to the flywheel along with the clutch cover, and formed at a center portion thereof with a seating part which projects in one direction toward the flywheel;

a cylindrical output shaft rotatably fitted at one end thereof through the seating part of the clutch base and at the other end thereof through the clutch cover, and having a first sun gear and a second sun gear which are integrally formed on a circumferential outer surface thereof and spline grooves which are defined on a circumferential inner surface thereof, the first and second sun gears having different numbers of teeth or different modules;

a pair of first planetary gear sections oppositely arranged to each other and each possessing a first guide shaft and a first planetary gear, the first guide shaft having one end which is rotatably fitted through the seating part of the clutch base and the other end which is rotatably supported by the clutch cover, the first planetary gear being integrally formed on a circumferential outer surface of the first guide shaft and being meshed with the first sun gear of the cylindrical output shaft;

a pair of second planetary gear sections oppositely arranged to each other and each possessing a second guide shaft and a second planetary gear, the second guide shaft having one end which is rotatably fitted through the seating part of the clutch base and the other end which is rotatably supported by the clutch cover, the second planetary gear being integrally formed on a circumferential outer surface of the second guide shaft and being meshed with the second sun gear of the cylindrical output shaft;

an annular plate-shaped first rotating member rotatably brought into contact at one surface thereof with the clutch base by the medium of a first thrust bearing, the first rotating member having a first internal ring gear and a first connecting part, the first internal ring gear being formed on a circumferential inner edge of the first rotating member and being meshed with first planetary gears of the pair of first planetary gear sections, the first connecting part being formed on the other surface of the first rotating member adjacent to a circumferential outer edge of the first rotating member and having a plurality of first corrugations which axially project from a plane of the first rotating member to extend in the other direction toward the clutch cover;

an annular plate-shaped second rotating member rotatably brought into contact at one surface thereof with the other surface of the first rotating member by the medium of a second thrust bearing and at the other surface thereof with the clutch cover by the medium of a third thrust bearing, the second rotating member having a second internal ring gear and a circumferential recess, the second internal ring gear being formed on a circumferential inner edge of the second rotating member and being meshed with second planetary gears of the pair of second planetary gear sections, the circumferential recess being defined along an axial middle portion of a circumferential outer edge of the second rotating member;

an annular plate-shaped third rotating member having a boss which is integrally formed along a circumferential inner edge of the third rotating member in a manner such that the boss axially projects from a plane of the third rotating member to extend in the one direction toward the clutch base, the boss having a second connecting part and a circumferential guide projection, the second connecting part being formed on a free end surface of the boss and having a plurality of second corrugations which axially project from the free end surface of the boss to extend in the one direction toward the clutch base in a manner such that the second corrugations are meshed with the first corrugations of the first rotating member, the circumferential guide projection being formed on a circumferential inner surface of the boss to extend in a radial direction and being brought into sliding contact with the circumferential outer edge of the second rotating member;

semi-clutch means having one ends which are connected to the third rotating member and the other ends which are connected to the second rotating member, so as to enable a semi-clutching operation of the clutch to be implemented;

a plurality of elastic clutching members having one ends which are fitted into the circumferential recess of the second rotating member and the other ends which elastically bias the third rotating member in the one direction toward the clutch base; and a plurality of disengaging members inserted through the clutch cover and moved in the other direction toward the clutch cover when external force is applied to the proximal ends of the release levers, thereby to disengage the third rotating member from the first rotating member.

2. The car clutch as claimed in claim 1, wherein each semi-clutch means comprises:

a fitting groove defined in a bottom of the circumferential recess of the second rotating member in such a manner that it extends in the radial direction;

a fixing pin inserting bore defined through the second rotating member in such a manner that it extends in an axial direction and is communicated with the circumferential recess;

a fixing pin which is inserted through the fixing pin inserting bore;

a torsion spring wound around the fixing pin and having one end which is fitted into the fitting groove and the other end around which a bushing is fitted; and a guide slot defined in the third rotating member in a manner such that it extends in the radial direction, the other end of the torsion spring being inserted into the guide slot to be slidably moved therein.

3. The car clutch as claimed in claim 1, wherein each disengaging member comprises:

a pull rod inserted through the clutch cover, formed at one end thereof with a head portion which is grasped by a distal end of the release lever, and defined adjacent to the other end thereof with a circumferential groove;

a pull rod-inserting boss formed on the clutch base in a manner such that the other end of the pull rod is inserted therein;

a pressing ring fitted around the pull rod to be brought into contact with one surface of the third rotating member adjacent to a circumferential outer edge of the third rotating member; and a release-preventing ring fitted into the circumferential groove to prevent the pressing ring from being released from the pull rod.

4. The car clutch as claimed in claim 1, wherein each release lever is hingedly coupled to an outer surface of the clutch cover.

5. A car clutch wherein a clutch cover is mounted to a free end surface of a flywheel which is integrally rotated with a crankshaft of an engine, power of the flywheel is transmitted to a clutch shaft by means of a clutch mechanism which is disposed inside the clutch cover, and, when a switch button is depressed, power of the flywheel is not transmitted to the clutch shaft, the clutch mechanism comprising:

a disc-shaped clutch base interposed between the flywheel and the clutch cover, coupled to the flywheel along with the clutch cover, and formed at a center portion thereof with a seating part which projects in one direction toward the flywheel;

a cylindrical output shaft rotatably fitted at one end thereof through the seating part of the clutch base and at the other end thereof through the clutch cover, and having a first sun gear and a second sun gear which are integrally formed on a circumferential outer surface thereof and spline grooves which are defined on a circumferential inner surface thereof, the first and second sun gears having different numbers of teeth or different modules;

a pair of first planetary gear sections oppositely arranged to each other and each possessing a first guide shaft and a first planetary gear, the first guide shaft having one end which is rotatably fitted through the seating part of the clutch base and the other end which is rotatably supported by the clutch cover, the first planetary gear being integrally formed on a circumferential outer surface of the first guide shaft and being meshed with the first sun gear of the cylindrical output shaft;

a pair of second planetary gear sections oppositely arranged to each other and each possessing a second guide shaft and a second planetary gear, the second guide shaft having one end which is rotatably fitted through the seating part of the clutch base and the other end which is rotatably supported by the clutch cover, the second planetary gear being integrally formed on a circumferential outer surface of the second guide shaft and being meshed with the second sun gear of the cylindrical output shaft;

an annular plate-shaped first rotating member rotatably brought into contact at one surface thereof with the clutch base by the medium of a first thrust bearing, the first rotating member having a first internal ring gear and a first connecting part, the first internal ring gear being formed on a circumferential inner edge of the first rotating member and being meshed with first planetary gears of the pair of first planetary gear sections, the first connecting part being formed on the other surface of the first rotating member adjacent to a circumferential outer edge of the first rotating member and having a plurality of first corrugations which axially project from a plane of the first rotating member to extend in the other direction toward the clutch cover;

an annular plate-shaped second rotating member rotatably brought into contact at one surface thereof with the other surface of the first rotating member by the medium of a second thrust bearing and at the other surface thereof with the clutch cover by the medium of a third thrust bearing, the second rotating member having a second internal ring gear and a circumferential recess, the second internal ring gear being formed on a circumferential inner edge of the second rotating member and being meshed with second planetary gears of the pair of second planetary gear sections, the circumferential recess being defined along an axial middle portion of a circumferential outer edge of the second rotating member;

an annular plate-shaped third rotating member having a boss which is integrally formed along a circumferential inner edge of the third rotating member in a manner such that the boss axially projects from a plane of the third rotating member to extend in the one direction toward the clutch base, the boss having a second connecting part and a circumferential guide projection, the second connecting part being formed on a free end surface of the boss and having a plurality of second corrugations which axially project from the free end surface of the boss to extend in the one direction toward the clutch base in a manner such that the second corrugations are meshed with the first corrugations of the first rotating member, the circumferential guide projection being formed on a circumferential inner surface of the boss to extend in a radial direction and being brought into sliding contact with the circumferential outer edge of the second rotating member, the third rotating member further having a magnetic plate portion which is integrally coupled to a circumferential outer edge of the third rotating member;

semi-clutch means having one ends which are connected to the third rotating member and the other ends which are connected to the second rotating member, so as to enable a semi-clutching operation of the clutch to be implemented;

a plurality of elastic clutching members having one ends which are fitted into the circumferential recess of the second rotating member and the other ends which elastically bias the third rotating member in the one direction toward the clutch base; and an electromagnetic device configured to attract the third rotating member when current is supplied thereto through manipulation of the switch button.

6. The car clutch as claimed in claim 5, wherein the electromagnetic device comprises:

an electromagnetic ring installed on an inner surface of the clutch cover in a manner such that the electromagnetic ring is opposite to the magnetic plate portion of the third rotating member;

a ground member locked to an outer surface of the clutch cover and connected to the electromagnetic ring via a first terminal cable having a negative polarity;

a guide boss fastened to the clutch cover around a center hole of the clutch cover, through which the clutch shaft is fitted;

an insulating ring fitted around the guide boss;

a first brush member fitted around the insulating ring in a manner such that the first brush member is integrally rotated with the insulating ring, the first brush member being connected to the electromagnetic ring via a second terminal cable having a positive polarity; and a second brush member fitted around the first brush member in a manner such that the second brush member is fixedly maintained with respect to the first brush member, the second brush member being connected to the switch button via a cable.

7. The car clutch as claimed in claim 5, wherein the magnetic plate portion of the third rotating member has an L-shaped cross-section.

8. A car clutch wherein a clutch cover is mounted to a free end surface of a flywheel which is integrally rotated with a crankshaft of an engine, power of the flywheel is transmitted to a clutch shaft by means of a clutch mechanism which is disposed inside the clutch cover, and, when a clutch pedal is depressed, a release bearing presses proximal ends of release levers and, by virtue of lever actions of the release levers, power of the flywheel is not transmitted to the clutch shaft, the clutch mechanism comprising:

a disc-shaped clutch base interposed between the flywheel and the clutch cover and coupled to the flywheel along with the clutch cover, and having a cylindrical supporting boss which is projectedly formed on an inner surface of the clutch base, the cylindrical supporting boss having first spline grooves which are defined on a circumferential inner surface of the cylindrical supporting boss;

a cylindrical output shaft rotatably fitted at one end thereof through the clutch base and at the other end thereof through the clutch cover, and having a sun gear which is formed on a circumferential outer surface thereof and second spline grooves which are defined on a circumferential inner surface thereof;

a plurality of planetary gear sections each possessing a guide shaft and a planetary gear, the guide shaft having one end which is rotatably fitted through the clutch base and the other end which is rotatably supported by the clutch cover, the planetary gear being integrally formed on a circumferential outer surface of the guide shaft and being meshed with the sun gear of the cylindrical output shaft;

a rotating member having an internal ring gear and third spline grooves, the internal ring gear being formed on a circumferential inner surface of the rotating member and being meshed with planetary gears of the plurality of planetary gear sections, the third spline grooves being defined on a circumferential outer surface of the rotating member;

a multiple disc clutch member having a plurality of inner plates which are fitted around the rotating member and a plurality of outer plates which are fitted into the cylindrical supporting boss of the clutch base and each of which is intervened between two adjoining inner plates, each inner plate having spline teeth which are formed on a circumferential inner surface thereof and are splined into the third spline grooves of the rotating member, each outer plate having spline teeth which are formed on a circumferential outer surface thereof and are splined into the first spline grooves of the cylindrical supporting boss;

a pressing member disposed between the multiple disc clutch member and the clutch cover for elastically biasing the multiple disc clutch member in one direction toward the clutch base in a manner such that the inner plates and the outer plates are brought into tight contact one with another and thereby are locked one to another;

a plurality of pull rods inserted through the clutch cover and having one ends which are coupled to distal ends of the release levers and the other ends which are fastened to the pressing member, in a manner such that they are moved in the other direction toward the clutch cover when external force is applied to the proximal ends of the release levers, thereby to separate the pressing member from the multiple disc clutch member; and pressure adjusting means arranged in a circumferential space which is defined between the clutch base and the clutch cover, in a manner such that each pressure adjusting means is capable of pivoting movement for adjusting a pressure which is applied to the multiple disc clutch member by the pressing member, depending upon a magnitude of centrifugal force which is generated by rotation of the flywheel.

9. The car clutch as claimed in claim 8, wherein the pressing member comprises:

a pressure plate possessing an annular plate-shaped configuration and having a pressing part which projects from a plane of the pressure plate to be brought into contact with the multiple disc clutch member, the pressing part defining a plurality of spring receiving grooves on a surface thereof which is opposed to the multiple disc clutch member, the pressure plate being formed with a plurality of pull rod inserting holes through which the plurality of pull rods are inserted, respectively; and a plurality of springs inserted into the plurality of spring receiving grooves, respectively.

10. The car clutch as claimed in claim 8, wherein each pressure adjusting means comprises:

a support bar fastened at both ends thereof to the clutch base and the clutch cover, respectively, and having an externally threaded portion which is formed on a circumferential outer surface and at a middle portion thereof;

a compression spring fitted around the support bar;

a bearing-supporting ring fitted around the support bar in a manner such that it is brought into contact with an end of the compression spring;

an adjusting ring arranged in a side-by-side relationship with the pressure plate of the pressing member, so that support bars of all pressure adjusting means extend therethrough;

a balancing weight having one end which is placed between the compression spring and the adjusting ring and is formed with an internally threaded portion through which the support bar is threadedly coupled to the balancing weight to allow the balancing weight to be capable of pivoting movement about the one end of the balancing weight;

an elastic member having one end which is secured to the other end of the balancing weight and the other end which is secured to the clutch cover, so that the elastic member can return the balancing weight which is pivotally moved by the centrifugal force of the flywheel, to its original position; and a pair of guide bearings fitted around the support bar and located at both sides, respectively, of the one end of the balancing weight, to smooth the pivoting movement of the balancing weight.

11. The car clutch as claimed in claim 8, wherein the pressing member comprises a hydraulic device which is actuated through manipulation of a switch button by a driver, to bias the multiple disc clutch member in the one direction toward the clutch base, and an annular leaf spring is installed on the cylindrical supporting boss of the clutch base, to exert elastic pressing force on the hydraulic device thereby to remove external force which is applied to the multiple disc clutch member, whereby, without pressing the release levers by virtue of depressing the clutch pedal, the clutch can be operated and thereby the clutch pedal, release levers and the pressure adjusting means can be eliminated.

12. The car clutch as claimed in claim 11, wherein the hydraulic device comprises:

a piston guide part projectedly formed on an inner surface of the clutch cover and having a pair of piston guide grooves;

an oil inlet part projectedly formed on an outer surface of the clutch cover to define a ring-shaped configuration and having an oil groove which is defined on an outer surface thereof;

an oil supplying line formed in a manner such that it extends between the oil groove of the oil inlet part and a distal end of the piston rod guide part;

a piston brought into contact with the multiple disc clutch member by a pressure of oil which is supplied through the oil supplying line, the piston having a body which takes a clockwise 90° rotated U-shaped cross-section and a spring supporting projection against which an end of the annular leaf spring is supported; and a line connecting member coupled to the oil inlet part and fixedly maintained in a manner such that the clutch cover can be freely rotated with respect to the line connecting member, the line connecting member having a connector which is formed with an oil hole which in turn is communicated with the oil groove of the oil inlet part.

13. A car clutch wherein a clutch cover is mounted to a free end surface of a flywheel which is integrally rotated with a crankshaft of an engine, power of the flywheel is transmitted to a clutch shaft by means of a clutch mechanism which is disposed inside the clutch cover, and, when a clutch pedal is depressed, a release bearing presses proximal ends of release levers and, by virtue of lever actions of the release levers, power of the flywheel is not transmitted to the clutch shaft, the clutch mechanism comprising:

a disc-shaped clutch base interposed between the flywheel and the clutch cover and coupled to the flywheel along with the clutch cover, and having a cylindrical supporting boss and a cylindrical ring gear boss which are projectedly formed on an inner surface of the clutch base in a manner such that the cylindrical ring gear boss is placed inward of the cylindrical supporting boss, the cylindrical supporting boss having first spline grooves which are defined on a circumferential inner surface of the cylindrical supporting boss, the cylindrical ring gear boss having a first internal ring gear which is formed on a circumferential inner surface of the cylindrical ring gear boss;

a cylindrical output shaft rotatably fitted at one end thereof through a center portion of the clutch base and at the other end thereof through the clutch cover, and having a sun gear which is formed on a circumferential outer surface thereof and second spline grooves which are defined on a circumferential inner surface thereof;

a carrier having a first disc and a second disc which are coupled with each other by means of a plurality of connecting members in a manner such that the first disc and the second disc are spaced apart from each other by a predetermined distance, the first disc being rotatably brought into contact at one surface thereof with the inner surface of the clutch base by the medium of a first thrust bearing, the second disc being rotatably brought into contact with the clutch cover by the medium of a second thrust bearing;

a plurality of double planetary gear sections fitted around the plurality of connecting members, respectively, in such a way as to be disposed in the carrier, and each having integrally formed thereon a first planetary gear and a second planetary gear, the first planetary gear being meshed with the first internal ring gear, the second planetary gear being meshed with the sun gear of the cylindrical output shaft;

a ring-shaped rotating member having a second internal ring gear and third spline grooves, the second internal ring gear being formed on a circumferential inner surface of the rotating member and being meshed with second planetary gears of the plurality of double planetary gear sections, the third spline grooves being defined on a circumferential outer surface of the rotating member;

a multiple disc clutch member having a plurality of inner plates which are fitted around the rotating member and a plurality of outer plates which are fitted into the cylindrical supporting boss of the clutch base and each of which is intervened between two adjoining inner plates, each inner plate having spline teeth which are formed on a circumferential inner surface thereof and are splined into the third spline grooves of the rotating member, each outer plate having spline teeth which are formed on a circumferential outer surface thereof and are splined into the first spline grooves of the cylindrical supporting boss;

a pressing member disposed between the multiple disc clutch member and the clutch cover for elastically biasing the multiple disc clutch member in one direction toward the clutch base in a manner such that the inner plates and the outer plates are brought into tight contact one with another and thereby are locked one to another;

a plurality of pull rods inserted through the clutch cover and having one ends which are coupled to distal ends of the release levers and the other ends which are fastened to the pressing member, in a manner such that they are moved in the other direction toward the clutch cover when external force is applied to the proximal ends of the release levers, thereby to separate the pressing member from the multiple disc clutch member; and pressure adjusting means arranged in a circumferential space which is defined between the clutch base and the clutch cover, in a manner such that each pressure adjusting means is capable of pivoting movement for adjusting a pressure which is applied to the multiple disc clutch member by the pressing member, depending upon a magnitude of centrifugal force which is generated by rotation of the flywheel.

14. The car clutch as claimed in claim 13, wherein the first and second planetary gears have different numbers of teeth or different modules, to allow a predetermined reduction gear ratio to be obtained.

15. A car clutch wherein a clutch cover is mounted to a free end surface of a flywheel which is integrally rotated with a crankshaft of an engine, power of the flywheel is transmitted to a clutch shaft by means of a clutch mechanism which is disposed inside the clutch cover, and, when a clutch pedal is depressed, a release bearing presses proximal ends of release levers and, by virtue of lever actions of the release levers, power of the flywheel is not transmitted to the clutch shaft, the clutch mechanism comprising:

a disc-shaped clutch base interposed between the flywheel and the clutch cover, coupled to the flywheel along with the clutch cover, and formed at a center portion thereof with a seating part which projects in one direction toward the flywheel and a cylindrical ring gear boss which projects in the other direction toward the clutch cover, the cylindrical ring gear boss having an input-side internal ring gear which is formed on a circumferential inner surface of the cylindrical ring gear boss;

a cylindrical output shaft rotatably fitted at one end thereof through the seating part of the clutch base and at the other end thereof through the clutch cover, and having a first sun gear and a second sun gear which are integrally formed on a circumferential outer surface thereof and spline grooves which are defined on a circumferential inner surface thereof;

a carrier having a first carrier member and a second carrier member, the fist carrier member being rotatably brought into contact with an inner surface of the clutch base by the medium of a first thrust bearing and having a plurality of shaft inserting holes which are spaced apart one from another by a predetermined angle along a circumferential direction and an output shaft inserting hole which is defined at a center portion of the first carrier member to allow the one end of the cylindrical output shaft to be inserted therethrough, the second carrier member being rotatably brought into contact with the clutch cover by the medium of a second thrust bearing and having a plurality of shaft inserting holes which are spaced apart one from another by the predetermined angle along the circumferential direction and an output shaft inserting hole which is defined at a center portion of the second carrier member to allow the other end of the cylindrical output shaft to be inserted therethrough;

a pair of first planetary gear sections oppositely arranged to each other and each possessing a first guide shaft and a first planetary gear, the first guide shaft being installed between the first and second carrier members, the first planetary gear being fitted around the first guide shaft and being meshed with the first sun gear and the input-side internal ring gear;

a pair of second planetary gear sections oppositely arranged to each other and each possessing a second guide shaft and a second planetary gear, the second guide shaft being installed between the first and second carrier members, the second planetary gear being fitted around the second guide shaft and being meshed with the second sun gear;

a first rotating member possessing a cylindrical configuration, having an output-side internal ring gear which is formed on a circumferential inner surface of the first rotating member and is meshed with second planetary gears of the pair of second planetary gear sections and an auxiliary ring part which is integrally formed at an end of the first rotating member in such a way as to extend in a radial direction and is rotatably brought into contact with the clutch base, the auxiliary ring part having a plurality of engaging projections which are projectedly formed on a circumferential outer edge of the auxiliary ring part in such a way as to be spaced apart one from another along the circumferential direction and a plurality of spring engaging pieces which are integrally secured to a surface of the auxiliary ring part adjacent to the circumferential outer edge of the auxiliary ring part in such a way as to be spaced apart one from another along the circumferential direction and extend in an axial direction;

a second rotating member rotatably supported between the clutch base and the clutch cover, formed with two outward flange parts which are bent at an angle of 90° at both ends of the second rotating member to extend in the radial and circumferential directions to define a U-shaped cross-section, and having a connecting part which is projectedly formed on a circumferential outer surface of the second rotating member, the connecting part having a plurality of fitting grooves which are defined on a surface of the connecting part in a manner such that they are spaced apart one from another by a preset angle along the circumferential direction, one of the two outward flange parts having a plurality of engaging grooves which are defined on a circumferential inner edge of the one outward flange part in a manner such that the plurality of engaging projections of the first rotating member can be engaged into the plurality of engaging grooves, respectively, in such a way as to be capable of being rotated therein within the range of an angle;

a plurality of clutch springs wound around a plurality of fixing pins, respectively, which are fastened to the two outward flange parts of the second rotating member, in a manner such that the clutch springs are spaced apart one from another by a preselected angle along the circumferential direction, and each having one end which is inserted into a space defined between two adjoining spring engaging pieces and the other end which is supported by a circumferential inner surface of the second rotating member;

a plurality of power shutoff rods installed through the clutch cover in such a way as to be spaced apart one from another along the circumferential direction so that they can be moved into or out of the clutch cover upon applying or removing external force to or from the release levers, and each formed at one end thereof with a fitting projection which is fitted into one of the plurality of fitting grooves of the connecting part of the second rotating member and adjacent to the other end thereof with a flatted portion which is grasped by each release lever; and a plurality of lever-squeezing elastic members each installed between each release lever and the clutch cover in a manner such that external force can be applied to the release lever to fit the fitting projection of the power shutoff rod into one of the plurality of fitting grooves of the connecting part of the second rotating member.

16. The car clutch as claimed in claim 15, wherein each engaging projection of the first rotating member extends through an angle of about 15° along the circumferential direction, and each engaging groove in which the engaging projection is engaged, is defined through an angle of about 45° along the circumferential direction.

17. The car clutch as claimed in claim 15, wherein each lever-squeezing elastic member comprises a torsion spring which is wound around a hinge shaft for each release lever, the torsion spring having one end which is supported by a surface of the release lever and the other end which is supported against an outer surface of the clutch cover, and a hinged portion of the release lever is formed with a slit for allowing the one end of the torsion spring to be seated onto the release lever.

\* \* \* \* \*